United States Patent [19]

Koiwai

[11] Patent Number: 4,634,250
[45] Date of Patent: Jan. 6, 1987

[54] ZOOM LENS BARREL

[75] Inventor: Tamotsu Koiwai, Akigawa, Japan

[73] Assignee: Olympus Optical Company, Ltd., Tokyo, Japan

[21] Appl. No.: 722,527

[22] Filed: Apr. 12, 1985

[30] Foreign Application Priority Data

Jun. 5, 1984 [JP] Japan .................................. 59-115172
Jan. 16, 1985 [JP] Japan ..................................... 60-5234

[51] Int. Cl.$^4$ ............................................. G02B 15/00
[52] U.S. Cl. ................................................ 354/195.11
[58] Field of Search .................... 354/195.11, 232, 272, 354/274

[56] References Cited

U.S. PATENT DOCUMENTS 3,906,529  9/1975  Filipovich ...................... 354/195.11
3,918,797  11/1975  Takano ........................... 354/195.11
4,141,636  2/1979  Shimojima ...................... 354/195.11

Primary Examiner—Donald A. Griffin
Attorney, Agent, or Firm—Louis Weinstein

[57] ABSTRACT

A zoom lens barrel of the type in which an open F-value which is not maintained constant during a zooming operation by the original optical design, is caused to maintain an open F-value constant during a zooming operation, by the application of a diaphragm correction which is effected through a mechanical change in the diaphragm aperture. The diaphragm correction which is applied to maintain the open F-value constant is terminated when a diaphragm ring is set to an open F-value on the wide angle side or to a programmed mode position.

13 Claims, 26 Drawing Figures

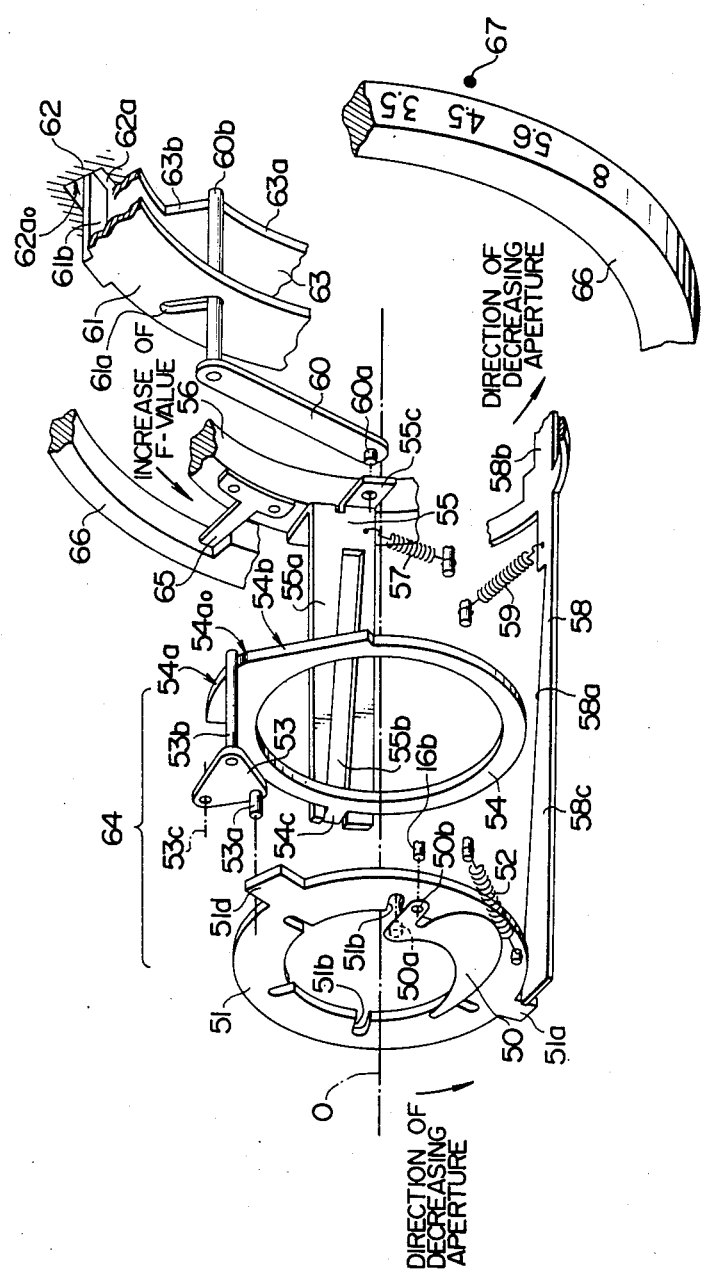

F I G. 8A
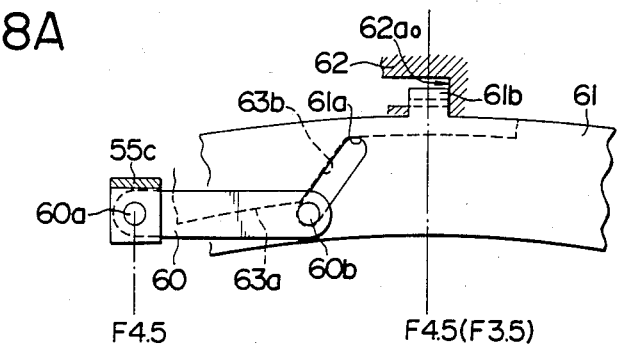
F I G. 8B
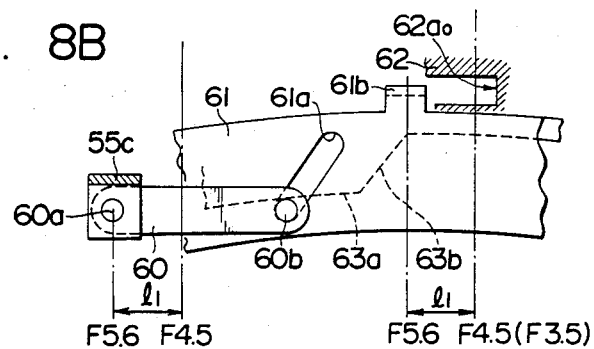
F I G. 8C
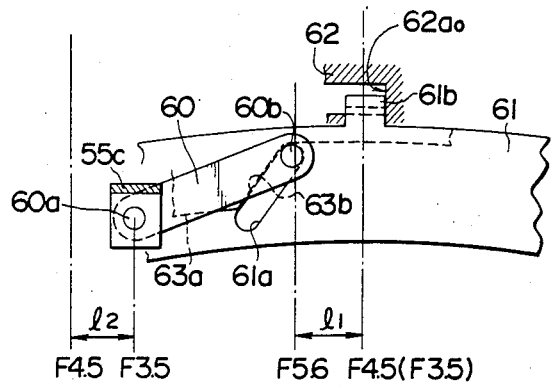

F 4.5

F 3.5

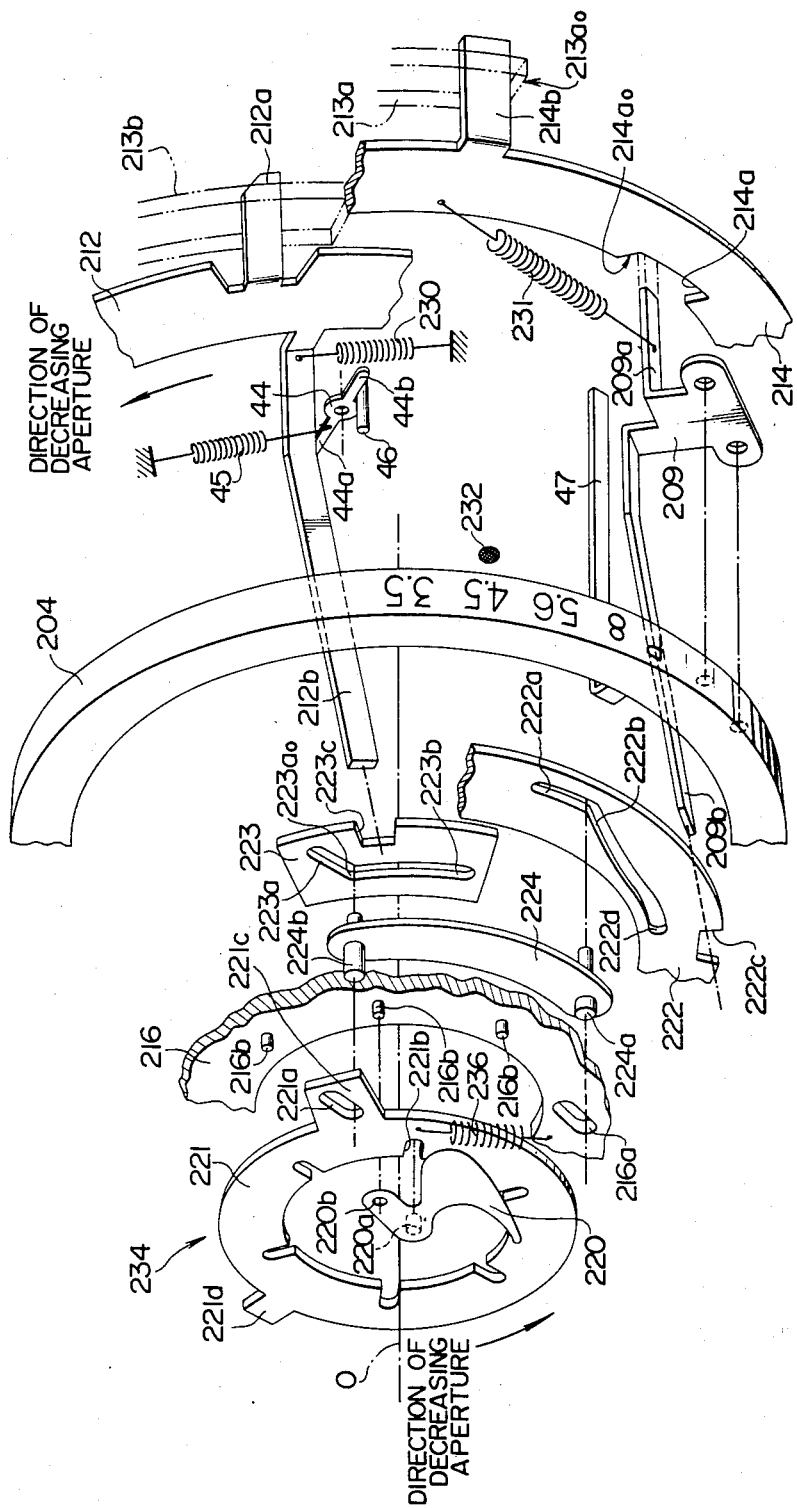

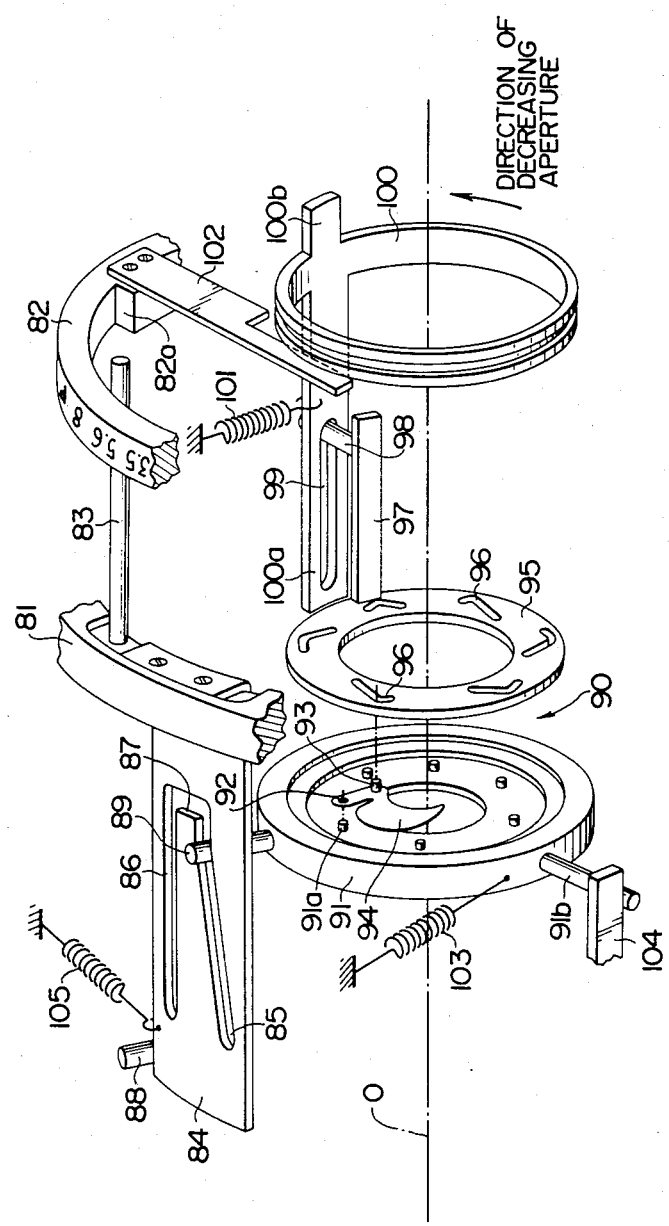

ZOOM LENS BARREL

BACKGROUND OF THE INVENTION

The invention relates to a zoom lens barrel, and more particularly, to a zoom lens barrel having the capability to correct a diaphragm aperture in interlocked relationship with a change in the focal distance which occurs during a zooming operation.

Zoom lens barrels which exhibit an open F-value which varies during a zooming operation when a diaphragm mechanism is made to prevent a change from occurring in the diaphragm aperture during a zooming operation include (1) a barrel without a correction mechanism, (2) a barrel which maintains a constant F-value by changing the diaphragm aperture mechanically during a zooming operation, and (3) a barrel, as disclosed in Japanese Laid-Open Patent Application No. 24,134/1974 and Laid-Open Utility Model Application No. 8,226/1978, in which a diaphragm aperture is permitted to vary during a zooming operation when an open photometry is made, but in which when a release causes the aperture to be reduced, a given F-value is achieved by accomplishing a correction during the open photometry by means of a diaphragm value transmitting member.

In a zoom lens barrel of the type (1), a scale on a diaphragm ring is given in terms of F-value for a given focal length, and hence accurate F-values cannot be read for other focal distances. Specifically, if an exposure factor is determined by viewing a meter located within a finder, the factor must be adjusted after a zooming operation. When it is combined with a camera which has an AE (automatic exposure) lock, a zooming operation subsequent to the lock which is performed by the photometry causes a change in the F-value, resulting in an aberrant exposure value. In particular, this represents a major disadvantage where the result of a spotwise photometry is stored since it is a frequent occurrence that if an accurate photometry is made toward the telephoto end, a picture is actually taken by zooming toward the wide-photo end.

A zoom lens barrel of the type (2) reduces a region of bright F-values toward the wide-photo end, which can be effectively utilized in the optical design, to F-values which are in excess of open F-values toward the telephoto end. Thus a sacrifice is made of a bright region which facilitates a focussing operation, thereby presenting difficulties in focussing within a finder and a framing operation. This caused inconveniences in a photographing mode which makes a maximum advantage of a bright F-value region toward the wide-photo end or in a programmed photographing mode which does not require a correction of F-values.

Considering a zoom lens barrel of the type (3), it may be assumed that an AE lock operates in following relationship with a shutter dial and a diaphragm value transmitting member. By way of example, assume that a nominal F4 lens is used having an open F-value which is equal to F4 toward the telephoto end and to F2.8 toward the wide-photo end, and that a diaphragm aperture of F5.6 is established by means of a diaphragm ring. When the AE lock operates toward the telephoto end, the diaphragm value transmitting member will be brought to a position corresponding to F5.6. If a zooming operation now takes place to bring the camera toward a wide angle condition, the open F-value will be equal to F2.8, and the diaphragm value transmitting member will shift to a position which is equivalent to F8 toward the telephoto end. Since the diaphragm ring is located at the position of F5.6, a shutter release operation causes the diaphragm aperture to be reduced to a condition corresponding to F5.6 under the wide angle condition. However, because the camera operates on the basis of information available from the telephoto end, a shutter speed will be established in a manner corresponding to F8, disadvantageously resulting in an overexposure by 1 EV. In addition, this barrel suffers from the problem of limited F-value at the maximum aperture in a similar manner to a lens barrel of the type (2). Finally, in an arrangement in which an open F-value information is varied during a zooming operation before it is transmitted to a camera body, the mechanism or electrical circuit required become complex, resulting in an increased cost.

Thus, there has been a need in the art for a zoom lens barrel which has the combined functions of correcting the open F-value so as to be maintained constant during a zooming operation and of terminating the correction function to permit the maximum diaphragm aperture to be maintained. To this end, (4) an arrangement has been recently proposed (Japanese Laid-Open Patent Application No. 10,910/1984) which has a correction mechanism to maintain an open F-value constant and a mechanism to maintain a diaphragm aperture and in which both mechanisms can be selectively switched over the entire range of zooming operation. However, in this arrangement, the occurrence or not of the correction takes place in response to the intent of a photographer which is activated in terms of a devoted manual member. Thus, a photographer must operate this manual member in addition to the diaphragm ring, which is troublesome in operation, and it is expected that a beginner may fail to operate it properly, thus standing in the way of a satisfactory photographing operation.

SUMMARY OF THE INVENTION

In view of the foregoing, it is a primary object of the invention to provide a zoom lens barrel in which an open F-value can be maintained constant over the entire range of zooming operation by allowing a diaphragm ring to establish a diaphragm aperture in the usual manner, and which is capable of terminating the correction function to maintain the open F-value constant, by merely turning the diaphragm ring to a given position, thus enabling the effective use of a bright open F-value inherent to the lens which is in excess of the open F-value.

It is another object of the invention to provide a zoom lens barrel which functions to terminate the correction function to thereby allow the diaphragm aperture to be maintained at its maximum value when a diaphragm ring is turned to a position corresponding to a diaphragm value of an aperture which is greater than the open F-value used during the telescoping operation.

It is a further object of the invention to provide a zoom lens barrel which maintains the diaphragm aperture at its maximum value by terminating the correction function whenever a diaphragm ring is turned to a programmed position beyond a point corresponding to a minimum diaphragm aperture.

In accordance with the invention, merely turning a diaphragm ring to a given position is all that is required to terminate the correction function which maintains the open F-value constant, thus dispensing with a separate manual member and hence eliminating the likelihood of causing an inadvertent operation. The zoom lens barrel of the invention can be effectively combined with a camera having the AE lock capability or a camera having a programmed control function. The zoom lens barrel of the invention can be advantageously used in focussing upon an object being photographed which is located in darkness. When the diaphragm ring is turned to a position corresponding to the open F-value in the telephoto end, the transmitting member which transmits a diaphragm value to the camera assumes an open position which is the same as when the diaphragm ring is turned to a position corresponding to the open F-value in the wide-photo end, and accordingly an open photometry is enabled between both positions.

BRIEF DESCRIPTION OF THE DRAWINGS

FIG. 7 is an exploded perspective view of a diaphragm control mechanism used in a zoom lens barrel constructed according to another embodiment of the invention;

FIGS. 8(A) to 8(C) are a series of fragmentary front views illustrating the position of an interlock member which transmits a diaphragm value to a camera when the diaphragm ring in the zoom lens barrel of FIG. 7 is turned to different positions;

FIG. 12 is an exploded perspective view, to an enlarged scale, of an essential part of the zoom lens barrel shown in FIG. 11.

FIG. 16 is a perspective view of an essential part of a zoom lens barrel according to still another embodiment of the invention.

DETAILED DESCRIPTION OF PREFERRED EMBODIMENTS

Figure 1:
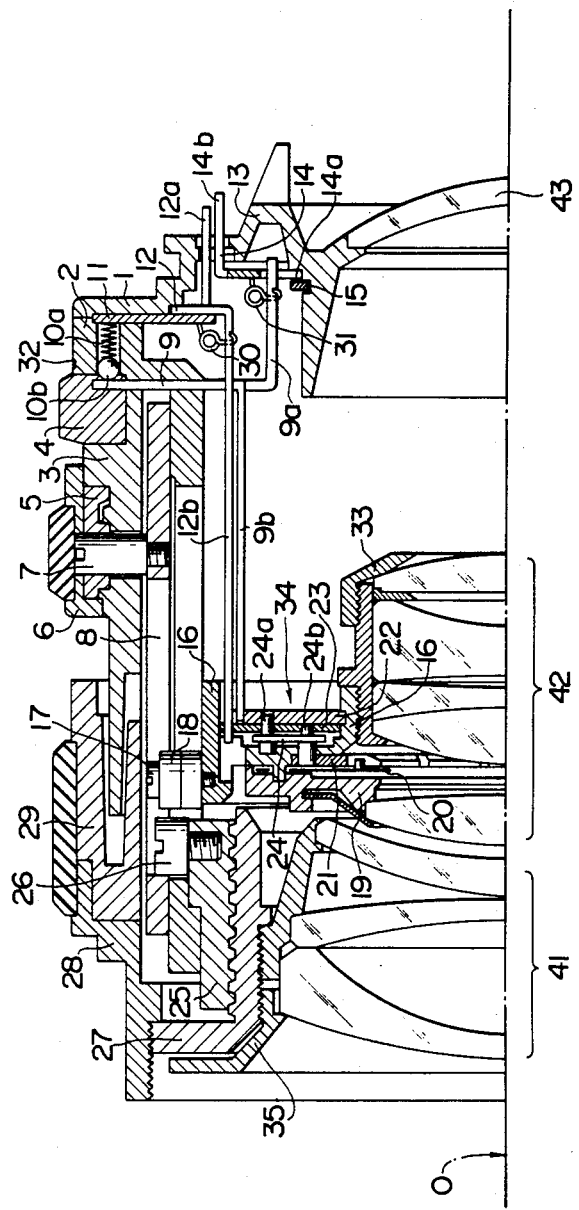
FIG. 1 is an enlarged cross section of an upper one-half of a zoom lens barrel according to one embodiment of the invention.

Referring to FIG. 1, there is shown a zoom lens barrel according to one embodiment of the invention in cross section. The barrel includes a lens mount 1 which is adapted to mate with a bayonet mount, not shown, provided on the body of a camera. Secured to the lens mount 1 is a fixed frame 2, to which is fixedly connected an external frame 3, around which a diaphragm ring 4 is fitted in a rotatable manner and is supported thereon. A setting ring 5 is rotatably fitted over the outer periphery of the external frame 3. A zoom ring 6 fits around and is secured to the setting ring 5. A cam ring 8 having a cam slot (not shown) which is utilized to cause a movement of a first and a second lens group 41, 42 is fitted in a rotatable manner between the fixed frame 2 and the external frame 3. A zoom pin 7 is fixedly mounted on the cam ring 8 and extends through a slot in the external frame 3 to be fitted into a groove formed in the setting ring 5 to be secured to the rings 5 and 6.

A diaphragm frame 16 and an outer helicoid frame 25 are slidably fitted around the inner periphery of the fixed frame 2. On its outer periphery, the diaphragm frame 16 fixedly carries a roller shaft 17 which carries a roller 18, which is adapted to be fitted into a translational groove formed in the fixed frame 2 and a cam slot formed in the cam ring 8, whereby as the cam ring 8 rotates in response to an angular movement of the zoom ring 6 which is transmitted through the zoom pin 7, the diaphragm frame 16 can be moved in the fore-and-aft direction. An automatic diaphragm mechanism 34 is disposed on the diaphragm frame 16, and a blade retainer frame 19 and a rear frame 33 having the second lens group 42 fixedly mounted thereon are secured to the diaphragm frame 16.

On its outer periphery, the outer helicoid frame 25 fixedly carries a pin 26 which fits in cam groove and cam slot formed in the fixed frame 2 and the cam ring 8, respectively, so that as the cam ring 8 rotates in response to the angular movement of the zoom ring 6, the outer helicoid frame 25 can be moved in the fore-and-aft direction. An inner helicoid frame 27 is threadably engaged with the inner periphery of the outer helicoid frame 25 by a helicoid screw, and a front frame 35 having the first lens group 41 fixedly mounted thereon is mounted around the inner periphery of the inner helicoid frame 27. The inner helicoid frame 27 threadably engages with a filter frame 28, which is integral with a distance ring 29 rotatably fitted around the cam ring 8, so as to be secured thereto. As a result, as the distance ring 29 rotates, both the filter frame 28 and the inner helicoid frame 27 rotate in an integral manner to move the first lens group 41 in the fore-and-aft direction.

Figure 2:
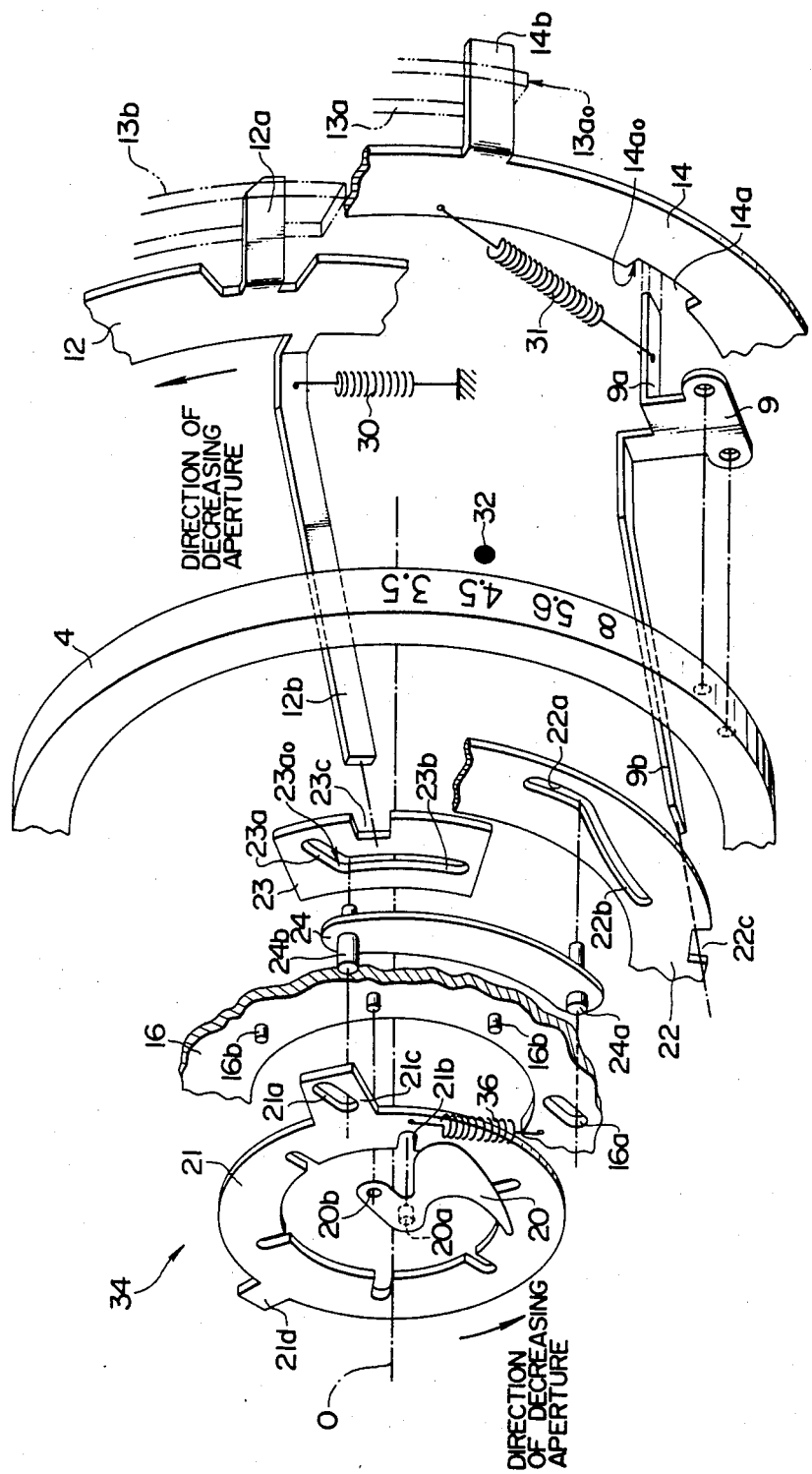
FIG. 2 is an exploded perspective view, to an enlarged scale, of an essential part of the zoom lens barrel shown in FIG. 1.

Fixedly connected to the diaphragm ring 4 is a diaphragm value presetting member 9 having a connecting portion 9a which extends rearwardly in parallel relationship with an optical axis O and a forwardly extending cam actuator 9b. The connecting portion 9a fits in a notched groove 14a formed in an interlock plate 14 which is used to transmit a diaphragm value and which rotatably fits in a cover frame 13 and is held in place by a retainer ring 15, the cover frame 13 fixedly carrying a third lens group 43 along the inside of the lens mount 1. The cam actuator 9b fits in a notch 22c in a diaphragm cam plate 22 of the automatic diaphragm mechanism 34 which determines a diaphragm aperture (FIG. 2).

Figure 3:
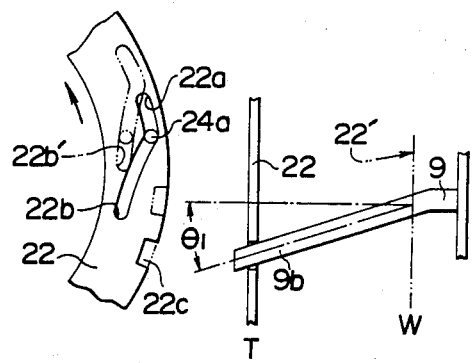
FIG. 3 is a schematic illustration of the positional relationship between a diaphragm value presetting member and a diaphragm cam plate used in the zoom lens barrel of FIG. 1 which varies during a zooming operation.

Referring to FIG. 3, it will be noted that the cam actuator 9b is skewed at an angle of $\theta_1$ clockwise, as viewed from its base end toward the free end. The interlock plate 14 extends rearwardly, and includes a body interlock 14b which projects through an arcuate groove 13a (see FIGS. 2 and 6) formed in the cover frame 13 toward the body of a camera so as to be engageable with an interlock member provided on the part of the body. A tension spring 31 extends between the connecting portion 9a of the presetting member 9 and the interlock plate 14 to urge the latter to rotate clockwise, as viewed from the front of the lens barrel, the clockwise or counter-clockwise direction being referred to hereinafter as viewed from the front of the lens barrel. As a result, one end $14a_0$ (see FIG. 2) of the notched groove 14a of the interlock plate 14 abuts against the connecting portion 9a.

A click stop arrangement for the diaphragm ring 4 is provided and comprises a spring 10a having its one end secured to the fixed frame 2 and a click ball 10b which is urged by the spring. It normally maintains the diaphragm ring 4 at a position where an index 32 (see FIG. 2) which is imprinted on the periphery of the fixed frame 2 is aligned with a selected diaphragm value on the scale of the diaphragm ring 4. An annular stop plate 11 is fixed between the lens mount 1 and the fixed frame 2, and a diaphragm control transmitting member 12 is rotatably fitted between the stop plate 11 and the lens mount 1. The transmitting member 12 includes an engaging portion 12a which extends rearwardly in parallel relationship with the optical axis O and a forwardly extending diaphragm plate actuator 12b. The engaging portion 12a projects through an arcuate groove 13b (see FIGS. 2 and 6) formed in the cover frame 13 within the lens mount 1, toward the body of the camera for engagement with a diaphragm drive lever, not shown, provided on the body of the camera. The diaphragm plate actuator 12b is engaged with a notch 23c formed in a diaphragm plate 23 of the automatic diaphragm mechanism 34 (see FIG. 2). The actuator 12b is skewed at an angle of $\theta_2$ clockwise from its base end toward its free end (see FIG. 4). A spring 30 has its opposite ends anchored to the transmitting member 12 and the stop plate 11 for urging the diaphragm control transmitting member 12 in a direction to open diaphragm blades 20 of the automatic diaphragm mechanism 34.

The automatic diaphragm mechanism 34 includes diaphragm blades 20 and a notched wheel 21 which are interposed between the blade retainer frame 19 and the diaphragm frame 16. The construction of the diaphragm mechanism 34 is illustrated in FIG. 2 by an enlarged, exploded perspective view. There are six diaphragm blades 20, only one of which is shown in FIG. 2. The fulcrum of rotation of each blade 20 is defined by an aperture 20b which is fitted over a pivot pin 16b of the diaphragm frame 16, and each blade carries a detent pin 20a engaged with one of notches 21b formed around the inner periphery of the notched wheel 21 which is rotatable about the optical axis O. A spring 36 extends between the notched wheel 21 and the diaphragm frame 16 to urge the wheel 21 to rotate clockwise. As the wheel 21 rotates clockwise, the diaphragm blades 20 are turned in a manner to increase a diaphragm aperture while when the notched wheel 21 is rotated counter-clockwise against the resilience of the spring 36, the blades are operated to reduce a diaphragm aperture. Along its outer periphery, the notched wheel 21 is formed with a detent 21d which serves to limit the extent of rotation of the wheel 31, and with a projection 21c having a skewed slot 21a formed therein. An arcuate arm 24 fixedly carries a pin 24b on its one end, which extends therethrough to the opposite sides thereof and the forward portion of which fits in the skewed slot 21a. The rearwardly extending portion of the pin 24b fits in another skewed slot 23a formed in the diaphragm plate 23 which is disposed so as to be rotatable about the optical axis O. It is to be noted that the skewed slot 23a and the skewed slot 21a formed in the notched wheel 21 have a similar angle of inclination and a similar length. At its one end nearer the optical axis O, the skewed slot 23a continues to an arcuate slot 23b which is formed in the diaphragm plate 23 so as to be located at a uniform distance from the optical axis O. Because the notch 23c formed in the diaphragm plate 23 is engaged by the diaphragm plate actuator 12b of the diaphragm control transmitting member 12, it will be seen that if the transmitting member 12 is turned counter-clockwise against the resilience of the spring 30 when the pin 24b is located centrally in both skewed slots 23a and 21a, the skewed edge of the slot 23a acts to urge the pin 24b toward the optical axis O, thus rotating the notched wheel 21 counter-clockwise so as to close the diaphragm blades 20.

The diaphragm cam plate 22 rotatably fits around the diaphragm frame 16, and is formed with a pair of consecutive cam slots 22a, 22b which act to determine a diaphragm aperture. The cam slot 22a represents an opening cam slot while the cam slot 22b represents a closing cam slot. On the other end, the arm 24 fixedly carries a pin 24a extending therethrough, with a forwardly extending portion of the pin 24a being fitted in a skewed, elongate slot 16a formed in the diaphragm frame 16 and a rearwardly extending portion of the pin 24a being fitted either in the cam slot 22a or 22b. The opening cam slot 22a is arcuate in configuration and is spaced further away from the optical axis O than cam slot 22b while the closing cam slot 22b is formed in a skewed manner so as to move pin 24a closer to the optical axis O from its end where it continues to the opening cam slot 22a. Accordingly, when the pin 24a is located within the opening cam slot 22a, the pin 24b will be located at a point of inflection $23a_0$, defining a boundary between the skewed slot 23a and the arcuate slot 23b. However, as the diaphragm cam plate 22 is turned counter-clockwise to bring the pin 24a into the closing cam slot 22b the pin 24a moves closer to the optical axis O, and hence the pin 24b will be located within the skewed slot 23a. Since the notch 22c in the diaphragm cam plate 22 is engaged by the cam actuator 9b of the diaphragm value presetting member 9 as mentioned previously, the diaphragm ring 4 may be turned to bring the diaphragm cam plate 22 to an angular position which corresponds to a given F-value where the pin 24a is located within the closing cam slot 22b.

Figure 5:
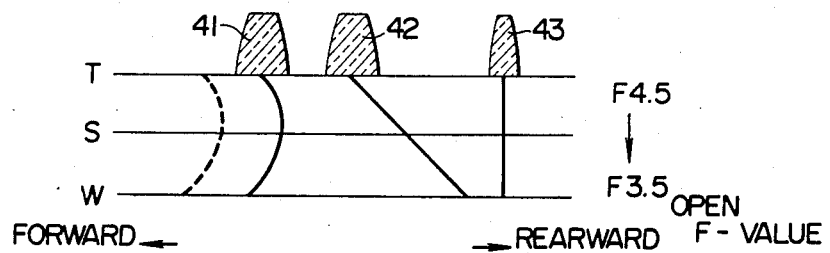
FIG. 5 is a schematic diagram illustrating changes in the position of respective lens groups used in the zoom lens barrel of FIG. 1 during a zooming operation and also illustrating changes in the open F-value when no correction is made.

The operation of the zoom lens barrel described above will now be specifically described. When the zoom ring 6 is rotated during a zooming operation, such rotation is transmitted through the zoom pin 7 to rotate the cam ring 8. A movement of the roller 18 along the cam slot formed in the cam ring 8 and the translational groove formed in the fixed frame 2 results in causing the diaphragm frame 16 and the outer helicoid frame 25 on the pin 26 to slide, thus causing a movement of the first and the second lens group 41, 42. When the zoom ring 6 is rotated from the telephoto end (T) to the wide-photo end (W) through the standard area (S), the individual lens groups 41, 42, 43 within the lens barrel move in a manner as indicated by solid lines in FIG. 5. Specifically, the third lens group 43 remains stationary while the first and the second lens group 41, 42 move in response to a zooming operation. In particular, the second lens group 42 in which the automatic diaphragm mechanism 34 is incorporated moves rearwardly as the zooming changes from the telephoto end toward the wide-photo end. The first lens group 41 moves fore and aft as the distance ring 29 rotates, and its movement occurs between a dotted line and a solid line curve.

Figures 6A, 6B, 6C:
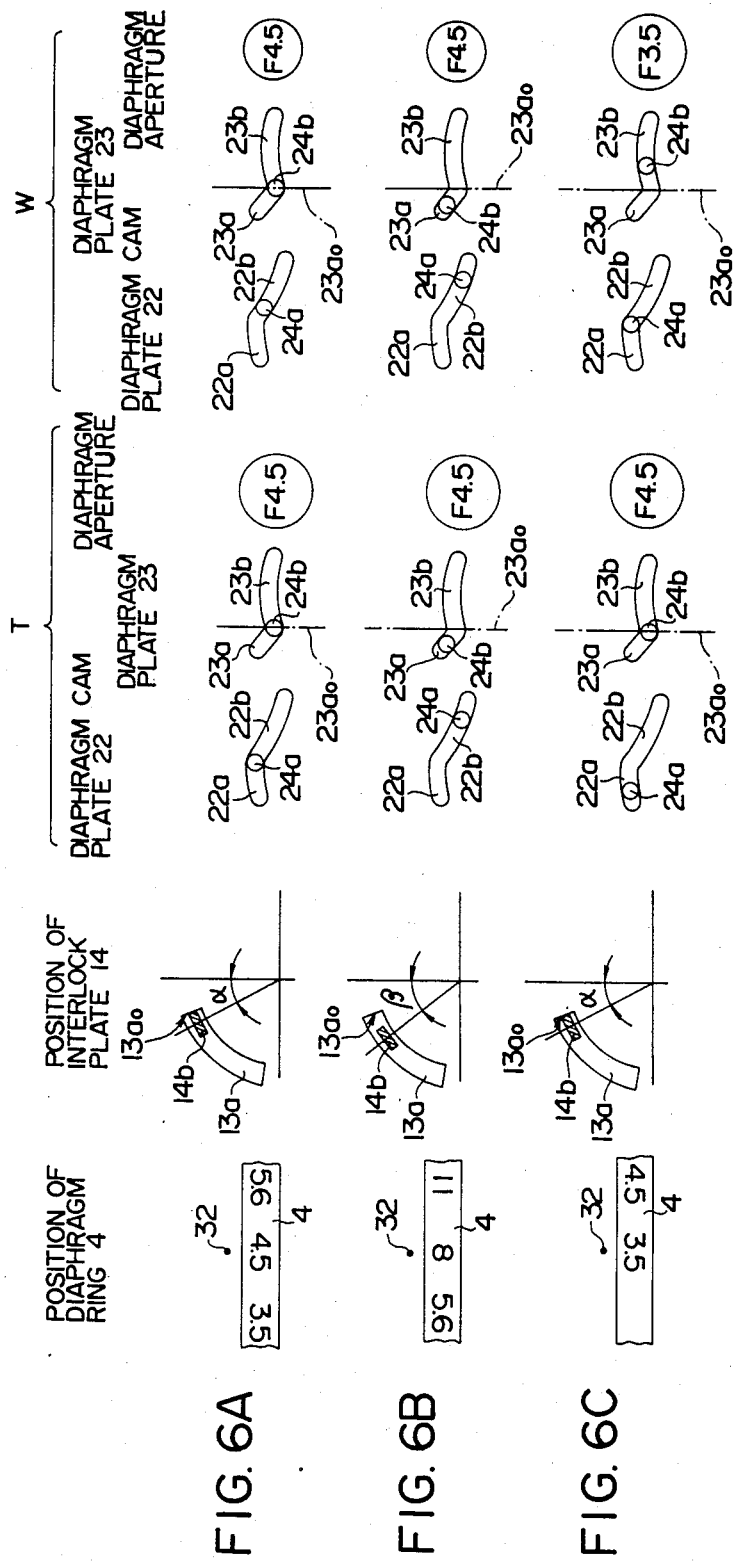
FIGS. 6(A) to 6(C) are a series of diagrams illustrating the position of an interlock plate when the diaphragm ring is turned to different preset diaphragm positions in the zoom lens barrel of FIG. 1 and also illustrating the diaphragm controlling operation and the diaphragm apertures achieved during a zooming operation.

In the description to follow, it is assumed that the zoom lens barrel is constructed so that the open F-value changes from F4.5 to F3.5, for example, by zooming from the telephoto end to the wide-photo end when a correcting function to maintain the open F-value constant is inoperative. FIGS. 6(A) to (C) illustrate the operations which occur when the diaphragm ring 4 is rotated to establish a diaphragm value of "F4.5", "F8" and "F3.5", respectively. Initially, when the mark "F4.5" on the diaphragm ring 4 is aligned with the index 32 as shown in FIG. 6(A), the interlock plate 14 is positioned such that the connecting portion 9a of the diaphragm value presetting member 9 abuts against one end $14a_0$ of the notched groove 14a (see FIG. 2), with the body interlock 14b abutting against one end of the arcuate slot 13a formed in the cover frame 13 or the stop $13a_0$. Thus, the body interlock 14b assumes an angular position in which it has rotated through an angle α from a reference position. At this angular position, the interlock plate 14 transmits the diaphragm open condition to the body of the camera.

Figure 4:
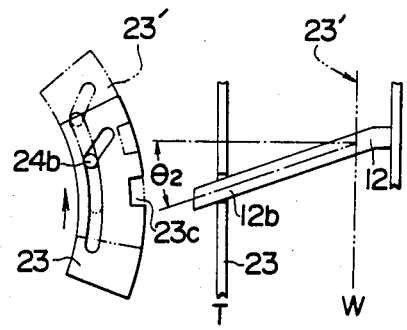
FIG. 4 is a schematic illustration of the positional relationship between a diaphragm control transmitting member and a diaphragm plate used in the zoom lens barrel of FIG. 1 which varies during a zooming operation.

Since the diaphragm cam plate 22 is located on the free end of the skewed cam actuator 9b of the diaphragm value presetting member 9, as shown in FIG. 3, when zooming toward the telephoto end (T) with the preset diaphragm position of "F4.5", the diaphragm cam plate 22 rotates clockwise, whereby the pin 24a on the arm 24 is located on the end of the opening cam slot 22a which is disposed toward the closing cam slot 22b. The diaphragm plate 23 is located on the free end of the skewed diaphragm plate actuator 12b of the diaphragm control transmitting member 12, as shown in FIG. 4, so that the diaphragm plate 23 rotates clockwise, whereby the pin 24b on the arm 24 is located at the point of inflection $23a_0$ of the skewed slot 23a. Under this condition, no movement of the pin 24b on the arm 24 occurs, and hence the notched wheel 21 does not rotate. Thus, diaphragm blades 20 are not operated, and the diaphragm aperture is at its maximum corresponding to the open F-value of "F4.5". If the diaphragm controlling lever on the camera is operated to cause the diaphragm control transmitting member 12 to rotate counter-clockwise against the spring 30 to thereby rotate the diaphragm plate 23 in the same direction, the pin 24b is located within the arcuate slot 23b without movement, and hence the diaphragm blades 20 are not controlled or driven in the closing direction.

When zooming toward the wide-photo end (W) with the preset diaphragm position of "F4.5", because the diaphragm cam plate 22 assumes its position 22', shown in phantom line in FIG. 3, or toward the base end of the cam actuator 9b of the diaphragm transmitting member 9, the diaphragm cam plate 22 rotates counter-clockwise, and the pin 24a on the arm 24 is positioned within the closing cam slot 22b which has moved to its position 22b'. As a consequence, the pin 24a moves along the slot 16a formed in the diaphragm frame 16 to a position closer to the optical axis O. The pin 24a is located within the slot 16a at a position which is equivalent to "F4.5" under the wide angle condition. Hence, assuming that the diaphragm plate 23 does not rotate, the pin 24b moves along the skewed slot 23a in a direction away from the optical axis O to a position which is equivalent to "F4.5" under the wide angle condition. At this time, the diaphragm plate 23 assumes its position 23' shown in phantom line in FIG. 4 or toward the base end of the diaphragm plate actuator 12b of the diaphragm control transmitting member 12. Accordingly, the diaphragm plate 23 rotates counter-clockwise, and the pin 24b on the arm 24 is located on the point of inflection $23a_0$ which it assumes after the movement. As the pin 24b rotates counter-clockwise to the moved point of inflection $23a_0$ on the diaphragm plate 23, the notched wheel 21 is caused to rotate through the same angle counter-clockwise, with the consequence that the diaphragm blades 20 are closed to an aperture which is equivalent to the open F-value of "F4.5" under the wide angle condition. If the camera is now operated to cause the diaphragm control transmitting member 12 to rotate counter-clockwise, the diaphragm aperture is not reduced from the open F-value of "F4.5" since the pin 24b is located on the point of inflection $23a_0$ within the skewed slot 23a. Thus, a picture is taken with the open value of "F4.5".

Zooming to any point between the telephoto end (T) and the wide-photo end (W) results in a similar operation as when zooming to the wide-photo end, and the diaphragm blades 20 are controlled to define a diaphragm aperture which corresponds to the open F-value of "F4.5" for the focal length selected. Accordingly, when the diaphragm ring 4 is preset to a diaphragm value of "F4.5", the open F-value remains constant at "F4.5" without any change in response to the zooming operation.

When the "F8" mark on the scale of the diaphragm ring 4 is brought into alignment with the index 32 as shown in FIG. 6(B), the interlock plate 14 is located such that the connecting portion 9a of the diaphragm value presetting member 9 abuts against one end $14a_0$ of the notched slot 14a (see FIG. 2), with the body interlock 14b being spaced from the stop $13a_0$ of the arcuate slot 13a formed in the cover frame 13 by an angle counter-clockwise which is equivalent to a difference in the light level between "F4.5" and "F8". Thus the body interlock 14b assumes an angular position which has rotated through an angle β ($>α$) from the reference position. At this angular position, the interlock plate 14 indicates to the body of the camera that the blades are controlled in the closing direction from the open diaphragm condition by a number of diaphragm control steps which correspond to the difference in the light level.

When zooming toward the telephoto end (T) at the preset diaphragm position of "F8", the diaphragm cam plate 22 is located on the free end of the cam actuator 9b of the diaphragm value presetting member 9. However, as the diaphragm ring 4 is turned to "F8", the diaphragm cam plate 22 is also driven by the cam actuator 9b to rotate counter-clockwise, whereby the pin 24a on the arm 24 moves within the closing cam slot 22b and the elongate slot 16a formed in the diaphragm frame 16 into the position which is equivalent to "F8" under the telescoping condition to thereby cause the arm 24 to rotate counter-clockwise along the inclination of the elongate slot 16a. Since the diaphragm plate 23 does not move angularly at this time, the pin 24b rises within the skewed slots 23a and 21a in a direction away from the optical axis O. Hence, the notched wheel 21 does not rotate and the diaphragm blades 20 are not controlled in the closing direction, and therefore the diaphragm aperture remains at its maximum and has an open F-value of "F4.5". If the diaphragm control transmitting member 12 is operated on the part of the camera to rotate counter-clockwise under this condition, the diaphragm plate 23 also rotates in the same direction, so that the pin 24b is depressed along the inclined surface of the slot 23a in a direction toward the optical axis O. This causes the notched wheel 21 to rotate counter-clockwise, and the diaphragm blades 20 are controlled to reduce the diaphragm aperture to "F8".

When zooming toward the wide-photo end (W) at the preset diaphragm position of "F8", the diaphragm cam plate 22 is located toward the base end of the camera actuator 9b of the diaphragm value transmitting member 9, and hence it rotates further counter-clockwise, whereby the pin 24a on the arm 24 moves within the closing cam slot 22b to a position which is equivalent to "F8" under the wide angle condition. Assuming that the diaphragm plate 23 does not rotate, the pin 24b would rise within the skewed slot 23a to a position which is equivalent to "F8" under the wide angle condition. However, at this time, the diaphragm plate 23 does rotate through the same angle as the angle through which it rotates under the wide angle condition of "F4.5", and hence the notched wheel 21 rotates through the same angle, causing the diaphragm blades 20 to be controlled to a reduced aperture of "F4.5" under the wide angle condition. If the diaphragm control transmitting member 12 is rotated counter-clockwise from this condition, the diaphragm plate 23 continues to rotate to depress the pin 24b along the inclined surface of the slot 23a, thus allowing the rotation of the notched wheel 21 to control the diaphragm blades 20 to a reduced aperture of "F8" under the wide angle condition.

When other diaphragm values than "F4.5" and "F8", such as diaphragm values of "F5.6" and "F11" which are greater than the "F4.5" are preset, the diaphragm aperture is corrected to provide an open F-value of "F4.5" irrespective of the zooming operation, in a the similar manner similar to an operation when the diaphragm values of "F4.5" and "F8" are used, as described, enabling an open photometry with this constant F-value.

When the "F3.5" mark on the diaphragm ring 4 is brought into alignment with the index 32 as shown in FIG. 6(C), the diaphragm value presetting member 9 moves clockwise beyond the position corresponding to "F4.5" to a position corresponding to "F3.5". Accordingly, the body interlock 14b of the interlock plate 14 abuts against the stop 13$a_0$ of the arcuate slot 13a formed in the diaphragm frame 13 while the connecting portion 9a of the diaphragm value presetting member 9 is removed from the end 14$a_0$ of the notched groove 14 formed in the interlock plate 14 against the tension of the spring 31. Accordingly, when the diaphragm ring 4 is set to the position of "F3.5", the body interlock 14b assumes an angular position which is reached by an angle of rotation $\alpha$ from the reference position, in a similar manner as that when the body interlock 14b assumes for "F4.5", thus remaining at its open position where it transmits an open diaphragm condition to the camera.

When zooming toward the telephoto end (T) in the preset diaphragm position of "F3.5", the diaphragm cam plate 22 is located on the free end of the cam actuator 9b of the diaphragm value transmitting member 9, and hence it rotates clockwise beyond the position which corresponds to "F4.5" under the telescoping condition. Accordingly, the pin 24a on the arm 24 rises to a position within the opening cam slot 22a formed in the diaphragm cam plate 22. The pin 24b on the arm 24 is then located on the point of inflection 23$a_0$ in the skewed slot 23a in the diaphragm plate 23. Because the diaphragm plate 23 does not rotate, the notched wheel 21 does not rotate, and hence the diaphragm blades 20 are not controlled in the closing direction, leaving the open F-value at "F4.5". If the diaphragm control transmitting member 12 is then operated on the camera to rotate counter-clockwise to cause the diaphragm plate 23 to rotate in the same direction, the pin 24b moves through the arcuate slot 23b without movement, with the consequence that no diaphragm controlling operation takes place.

When zooming toward the wide-photo end (W) at the preset diaphragm position of "F3.5", the diaphragm cam plate 22 is located toward the base end of the cam actuator 9b of the diaphragm value presetting member 9 as before, and hence it rotates in the counter-clockwise direction to a greater degree than in the telescoping operation. Accordingly, the pin 24a on the arm 24 remains stationary at the end of the opening cam slot 22a which is located toward the closing cam slot 22b, or at the same position as it assumes for "F4.5" under the telescoping condition. Hence, assuming that the diaphragm plate 23 does not rotate, the pin 24b on the arm 24 would be located on the point of inflection 23$a_0$ in the skewed slot 23a. However, since the diaphragm plate 23 also assumes a position which is located adjacent to the base end of the actuator 12b of the diaphragm control transmitting member 12, the diaphragm plate 23 rotates counter-clockwise according to the skewed configuration of the actuator 12b. In this manner, the pin 24b is situated within the arcuate slot 23b without any movement caused by the diaphragm plate 23, and hence the notched wheel 21 remains stationary and does not control the diaphragm blades 20 in the closing direction. As a consequence, the diaphragm aperture is of an open F-value, which is the same as the open F-value under the telescoping condition of "F4.5" or the open F-value under the wide angle condition of "F3.5". If the diaphragm control transmitting member 12 is operated on the camera to rotate counter-clockwise under this condition, the pin 24b remains without movement since it is located within the arcuate slot 23b in the rotating diaphragm plate 23, resulting in a failure to control the diaphragm blades 20 in the closing direction and thus maintaining the open F-value of "F3.5".

When zooming to an arbitrary point between the telephoto end (T) and the wide-photo end (W), at the preset diaphragm position of "F3.5", the pin 24a on the arm 24 is located within the opening cam slot 22a formed in the diaphragm cam plate 22, and hence the pin 24b is located within the arcuate slot 23b formed in the diaphragm plate 23, resulting in a failure to control the diaphragm blades 20 in the closing direction. Accordingly, the diaphragm aperture remains at its maximum, and the open F-value varies between "F4.5" and "F3.5" in accordance with the zooming operation, and assumes a value which depends on the focal length at the position between the telephoto end (T) and the wide-photo end (W). The body interlock 14b of the interlock plate 14 abuts against the stop 13$a_0$ of the arcuate slot 13a formed in the cover frame 13 to assume its open position, which is detected by the camera to permit the open photometry at the maximum aperture.

FIG. 7 is an exploded perspective view of essential parts of a zoom lens barrel according to another embodiment of the invention. Various parts of the zoom lens barrel other than those shown in FIG. 7 are constructed in substantially the same manner as the corresponding parts of the zoom lens barrel shown in FIG. 1. An automatic diaphragm mechanism 64 is disposed on the diaphragm frame 16, and a plurality of diaphragm blades 50 are retained between the blade retainer 19 (see FIG. 1) and a notched wheel 51, generally in a manner similar to the automatic diaphragm mechanism 34 mentioned above. Each diaphragm blade 50 is formed with a support opening 50b which is fitted over the pin 16b on the diaphragm plate 16, and carries a detent pin 50a which is adapted to engage one of the notches 51b formed around the inner periphery of the notched wheel 51. A spring 52 extends between the notched wheel 51 and the diaphragm frame 16 to urge the wheel 21 for rotation in the counter-clockwise direction. When the wheel 51 rotates counter-clockwise under the resilience of the spring 52, the diaphragm blades 50 are closed. On the contrary, when the wheel 51 is rotated clockwise against the resilience of the spring 52, the diaphragm blades 50 are operated to increase the diaphragm aperture. Along its outer periphery, the wheel 51 is formed with an engaging pawl 51a which is adapted to engage a diaphragm control transmitting member 58, and with a stop pawl 51d which is adapted to engage a pin 53a on a bell crank lever 53. An annular diaphragm cam plate 54 is located rearward of the wheel 51 and is rotatably fitted in the diaphragm frame 16. Along part of the outer periphery, the diaphragm cam plate 54 is formed with an opening cam surface 54a of an arcuate configuration which is located at a uniform distance from the optical axis O and which continues to a closing cam surface 54b having a distance to the optical axis O which progressively decreases from its end adjacent to the cam surface 54a. A projection 54c is formed on the outer periphery of the diaphragm cam plate 54 and is used to drive it. The bell crank lever 53 is rotatably mounted on a pin 53c mounted on the diaphragm frame 16, and carries a forwardly extending pin 53a which is effective to determine the position where the rotation of the wheel 51 in the closing direction is to be stopped, by extending to a position which is rotated counter-clockwise from the stop pawl 51d. The lever 53 also carries a rearwardly extending cam engaging pin 53b which is disposed for abutment against either cam surface 54a or 54b on the diaphragm cam plate 54.

A diaphragm value presetting member 55 is secured to a diaphragm ring connecting member 56, and is urged to rotate counter-clockwise by a spring 57 which extends between the member 55 and a stationary part of the lens barrel. A rotary plate 65 which is integral with the connecting member 56 is urged by the spring 57 into abutment against a detent step formed in a diaphragm ring 66, and remains stationary at such position. Accordingly, when the diaphragm ring 66 rotates, the connecting member 56 also rotates in an integral manner with the diaphragm ring 66. The diaphragm ring 66 cooperates with a stationary frame of the zoom lens barrel to define a click stop mechanism, similar to that mentioned above in connection with the first embodiment, and thus can be maintained at rest against the resilience of the spring 57 so that a selected diaphragm value mark thereon is aligned with an index 67. The diaphragm value presetting member 55 has an arm 55a which extends forwardly along the optical axis O and in which a cam actuating, elongate slot 55b is formed so as to be slightly skewed clockwise progressing from the rear to the front end. The projection 54c on the diaphragm cam plate 54 is fitted into the slot 55b. The diaphragm value presetting member 55 has a link holder 55c formed in the rear portion thereof, having a support opening which is rotatably fitted over a preset pin 60a fixedly mounted on one end of a diaphragm value transmitting link 60. An interlock pin 60b is fixedly mounted on the other end of the link 60 and is slidably fitted into a skewed slot 61a formed in an annular interlock plate 61 which is disposed to be rotatable about the optical axis O. The outer periphery of the interlock plate 61 is formed with a body interlock 61b which is adapted to engage an interlocking member such as an exposure meter on the camera, the body interlock 61b projecting rearwardly through an arcuate slot 62a formed in a cover frame 62 on which the third lens group 43 (see FIG. 1) is fixedly mounted. The body interlock 61b is adapted to abut against a stop 62$a_0$ on one end of the slot 62a whenever the diaphragm ring 66 is set to a given diaphragm value nearer the open diaphragm value, namely, a diaphragm value equivalent to the open F-value under the telescoping condition and the open F-value under the wide angle condition of the lens system (or "F4.5" and "F3.5" of the previous embodiment). An end of the interlock pin 60b which further extends rearwardly is adapted for abutment against an arcuate cam surface 63a or cam surface 63b on a link cam 63 which is secured to the cover frame 62, the cam surface 63b rising from one end of the cam surface 63a in a direction away from the optical axis O with an angle of inclination which coincides with the inclination of the skewed slot 61a.

A diaphragm control transmitting member 58 is disposed to be rotatable about the optical axis O, and is normally urged for clockwise rotation by a spring 59 which extends between it and a stationary member. The transmitting member 58 has a forwardly extending arm 58c, the left-hand side of which is formed with a cam surface 58a which shifts or is skewed clockwise progressing from the rear to the front end. The cam surface 58a abuts against the engaging pawl on the wheel 51. The resilience of the spring 59 which causes the transmitting member 58 to rotate is greater than the resilience of the spring 52 which causes the wheel 51 to rotate, so that the wheel 51 is normally maintained in a position in which the diaphragm blades 50 are maintained fully open, as a result of being rotated clockwise against the resilience of the spring 52. It will thus be seen that the automatic diaphragm mechanism 64 is of a non-forced type. The rear end of the transmitting member 58 is formed with an engaging portion 58b which is adapted to engage a diaphragm drive lever, not shown, which is disposed within the camera. It is possible to establish any desired diaphragm value by rotating the diaphragm value presetting member 55 against the resilience of the spring 57 if the body interlock 61b of the interlock plate 61 is rotated clockwise under the condition that the diaphragm ring 66 is rotated counter-clockwise to establish a diaphragm value of minimum aperture.

The diaphragm controlling operation with the zoom lens barrel shown in FIG. 7 will now be described. It is assumed that the zoom lens barrel of this embodiment employs the same lens system as that used in the previous embodiment, namely, a lens system having open F-values of "F4.5" toward the telephoto end (T) and of "F3.5" toward the wide-photo end (W).

When the diaphragm ring 66 is set to a position corresponding to "F4.5", the interlock pin 60b of the link 60 is located on the boundary between the cam surfaces 63a and 63b on the link cam 63 while bringing the interlock plate 61 to a position where the skewed slot 61a is aligned with the cam surface 63b on the link cam 63. An angular position which the interlock plate 61 assumes at this time represents an open position in which the body interlock 61b abuts against the stop 62a$_0$. When zooming toward the telephoto end by operating the zoom ring, at the preset diaphragm position of "F4.5", the automatic diaphragm mechanism 64 moves forwardly along the optical axis O together with the diaphragm frame, whereby the notched wheel 51 will be located on the front end of the arm 58c of the diaphragm control transmitting member 58 while the diaphragm cam plate 54 will be located on the front end of the arm 55a of the diaphragm value presetting member 55. Locating the notched wheel 51 on the front end of the cam surface 58a on the arm 58c constrains it to the clockwise limit of its rotation, and the diaphragm blades 50 are fully open to establish the open F-value of "F4.5". The position where the rotation of the diaphragm cam plate 54 is stopped is determined by the engagement between the projection 54c and the slot 55b at the front end of the arm 55a. The pin 53b on the bell crank lever 53 is located at a point of inflection 54a$_0$ between the opening cam surface 54a and the closing cam surface 54b of the diaphragm cam plate 54 which then assumes such position. This causes the pin 53a on the crank lever 53 to be located to the clockwise limit on the external periphery of the notched wheel 51. Consequently, if a shutter release operation takes place to cause the diaphragm control transmitting member 58 to rotate counter-clockwise against the resilience of the spring 59, the notched wheel 51 cannot be rotated as a result of the constraint by the pin 53a, resulting in a failure to control the diaphragm blades in the closing direction, thus maintaining "F4.5" under the telescoping condition.

When zooming toward the wide-photo end while maintaining the diaphragm ring 66 at the position corresponding to "F4.5", the notched wheel 51 and the diaphragm cam plate 54 move rearwardly, whereby the notched wheel 51 is rotated counter-clockwise by the action of the cam surface 58a while the diaphragm cam plate 54 is rotated counter-clockwise by the action of the elongate slot 55b. The rotation of the wheel 51 controls the diaphragm blades 50 in the closing direction to reduce the diaphragm aperture to a value which is equivalent to "F4.5" under the wide angle condition. The rotation of the diaphragm cam plate 54 causes the pin 53b on the crank lever 53 to move to a position on the closing cam surface 54b corresponding to "F4.5" under the wide angle condition where it comes to a stop. As a result, the pin 53a has moved to the left of the position which it assumed at "F4.5" under the telescoping condition. The stop pawl 51d on the notched wheel 51 which has rotated counter-clockwise as a result of the zooming operation abuts against the pin 53a. If a shutter release operation now takes place to rotate the diaphragm value transmitting member 58 counter-clockwise, a further rotation of the wheel 51 is prevented, and accordingly, the diaphragm aperture is maintained at "F4.5" under the wide angle condition.

If the diaphragm ring 66 is rotated counter-clockwise beyond "F4.5", to a position of "F5.6", for example, the interlock pin 60b of the link 60 abuts against the arcuate cam surface 63a of the link cam 63, as shown in FIG. 8(B). The angular position of the interlock plate 61 is then determined by the interlock pin 60b which is located in one end of the skewed slot 61a which is nearer the optical axis O. In other words, the interlock plate 61 rotates counterclockwise through an angle l$_1$ between positions corresponding to "F4.5" initially mentioned and "F5.6" now selected. This causes the body interlock 61b to be spaced by the same amount l$_1$ from the stop 62a$_0$, thus transmitting to the camera information concerning a number of diaphragm steps from the open diaphragm which corresponds to a difference in the light levels between "F4.5" and "F5.6".

When zooming toward the telephoto end at the preset diaphragm position of "F5.6", the notched wheel 51 is located to engage the front end of the cam surface 58a, as when telescoping with "F4.5" to maintain the diaphragm blades 50 fully open. However, the diaphragm cam plate 54 has further rotated counter-clockwise than the position for "F4.5". This brings the pin 53b to a position on the closing cam surface 54b, whereby the bell crank lever 53 rotates clockwise and the pin 53a moves to the left so as to be removed from the stop pawl 51d, assuming a position which is equivalent to "F5.6" under the telescoping condition. Accordingly, before a shutter release takes place, the open diaphragm of "F4.5" is established, but as the diaphragm control transmitting member 58 rotates counter-clockwise in response to the shutter release, the notched wheel 51 reaches an angular position where the stop pawl 51d is constrained by the pin 53a, and the diaphragm blades 50 are controlled in the closing direction to establish "F5.6".

When zooming toward the wide-photo end at the preset diaphragm position of "F5.6", the notched wheel 51 rotates in a similar manner as with "F4.5" under the wide angle condition, and the diaphragm blades 50 are controlled in the closing direction to a diaphragm aperture which is equivalent to "F4.5" under the wide angle condition. The diaphragm cam plate 54 rotates in a manner corresponding to "F5.6" under the wide angle condition, and the pin 53b on the crank lever 53 comes to a stop at a position on the closing cam surface 54b which is equivalent to "F5.6" under the wide angle condition. Hence, the pin 53a is located at a position equivalent to "F5.6" under the wide angle condition which shifts to the left of the position equivalent to "F5.6" under the telescoping condition. Accordingly, before a shutter release takes place, a diaphragm aperture equivalent to "F4.5" under the wide angle condition is established, but as the diaphragm control transmitting member 58 rotates in response to the shutter release, the notched wheel 51 reaches an angular position which is constrained by the pin 53a, and the diaphragm blades 50 are controlled in the closing direction to a diaphragm aperture which is equivalent to "F5.6" under the wide angle condition.

When the diaphragm ring 66 is turned to a position which is equivalent to "F3.5", the interlock pin 60b of the link 60 causes the interlock plate 61 to rotate clockwise to bring the body interlock 61b into abutment against the stop 62a₀ at the angular position which is equivalent to "F4.5" and is urged to move further clockwise. As a consequence, the link 60 is urged to rotate counter-clockwise about the preset pin 60a, whereby the interlock pin 60b rises along the skewed slot 61a, and the inclined cam surface 63b. Thus, the preset pin 60b of the link 60 rotates clockwise through an angle l₂ from the position for "F4.5" to the position for "F3.5". However, the interlock plate assumes an open position where the body interlock 61b abuts against the stop 62a₀, in the same manner as for "F4.5".

When zooming toward the telephoto end at the preset diaphragm position of "F3.5", the notched wheel 51 fully rotates clockwise, in a similar manner as with "F4.5" under the telescoping condition, thus bringing the diaphragm blades 50 to their fully open position to establish an open F-value of "F4.5". The diaphragm cam plate 54 has also been brought to its limit of clockwise rotation by the use of the diaphragm value presetting member 55, and accordingly, the pin 53b on the crank lever 53 is located adjacent to an end of the opening cam surface 54a which is remote from the point of inflection 54a₀. Hence, the pin 53a of the bell crank lever 53 has fully rotated clockwise to its limit around the notched wheel 51 where it abuts against the stop pawl 51d, as with "F4.5" under the telescoping condition. If a shutter release now takes place to rotate the diaphragm control transmitting member 58 counter-clockwise, there occurs no rotation of the notched wheel 51, and hence the diaphragm blades 50 remain fully open, establishing an open F-value of "F4.5" under the telescoping condition.

When zooming toward the wide-photo end at the position of the diaphragm ring 66 which is equivalent to "F3.5", the notched wheel 51, which moves rearwardly as a result of the zooming operation, would stop at an angular position similar to that reached for "F4.5" under the wide angle condition, in view of the engagement between the engaging pawl 51a and the cam surface 58a, if the engagement between the stop pawl 51d and the pin 53a is not taken into consideration. However, as the diaphragm cam plate 54 moves rearwardly during the zooming operation and rotate counter-clockwise because of the engagement between the slot 55b and the projection 54c, the pin 53b of the bell crank lever 53 slides along the opening cam surface 54a until the point of inflection 54a₀ is reached where it comes to a stop. As a result, the pin 53a of the bell crank lever 53 does not change its position during the zooming operation, but remains at the limit of clockwise rotation around the notched wheel 51, in the same manner as for "F4.5" under the telescoping condition. This means that when zooming from the telephoto end toward the wideangle-photo end, the position of engagement between the stop pawl 51d and the pin 53a remains unchanged, and the wheel 51 remains stationary at an angular position in which it maintains the diaphragm blades 50 fully open. Thus, an open F-value of "F3.5" is established. If a shutter release now takes place to rotate the diaphragm control transmitting member 58 counter-clockwise, there occurs no rotation of the wheel 51, and hence the diaphragm blades 50 remain fully open.

It will be seen therefore that when the diaphragm ring 66 is set to "F3.5", the diaphragm blades 50 are fully open to establish a maximum aperture over the entire zoom range from the telephoto end to the wide-photo end, and the open F-value changes continuously from "F4.5" under the telescoping condition to "F3.5" under the wide angle condition. The body interlock 61b of the interlock plate 61 maintains its open position where it abuts against the stop 62a₀.

Figure 9:
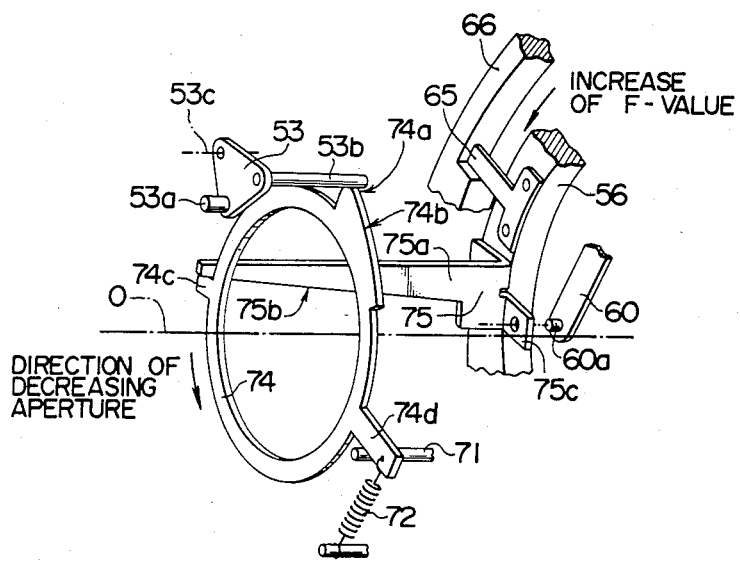
FIG. 9 is a perspective view of a modification of the diaphragm control mechanism shown in FIG. 7.

FIG. 9 shows a modification of the diaphragm cam plate, which drives the bell crank lever 53 shown in FIG. 7, and of the diaphragm control transmitting member which drives the diaphragm cam plate. In this modification, an annular diaphragm cam plate 74 is urged to rotate clockwise by a spring 72 which extends between a detent pawl 74d of the cam plate and a stationary member, and its rotation is stopped by the abutment of the detent pawl 74d against an elongate detent pin 71 which is fixedly mounted on a stationary member and which extends parallel to the optical axis O. On its outer periphery, the diaphragm cam plate 74 has a projection 74c which is adapted to engage the front end of an arm 75a of a diaphragm control transmitting member 75, and is also formed with an opening cam surface 74a, located remote from the projection 74c, extending over a limited length and being a given distance from the optical axis O. A closing cam surface 74b continues from the opening cam surface 74a on the clockwise end thereof. The diaphragm control transmitting member 75 is secured to the diaphragm ring connecting member 56, and has the arm 75a, one side of which, located on the counter-clockwise side thereof, is defined as a skewed cam surface 75b. The rear end of the transmitting member 75 is formed with a link holder 75c.

Figure 10A:
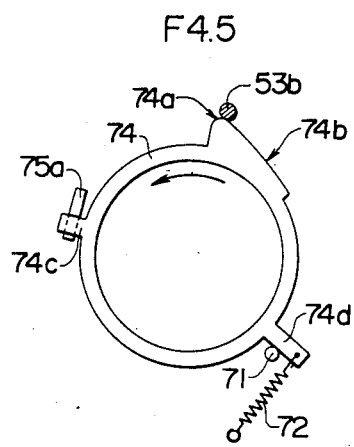
FIGS. 10(A) to 10(B) are front views illustrating the operation of the diaphragm control mechanism shown in FIG. 9 when different open F-values are chosen.

With a zoom lens barrel incorporating the diaphragm cam plate 74 and the diaphragm control transmitting member 75 mentioned above, the diaphragm ring 66 may initially be set to "F4.5". When a telescoping condition is chosen, the end of the cam surface 75b on the transmitting member 75 abuts against the projection 74c on the diaphragm cam plate 74 and the detent pawl 74d on the cam plate 74 abuts against the detent pin 71, as shown in FIGS. 9 and 10(A). Thus, the diaphragm cam plate 74 has ceased to rotate after rotating clockwise to its limit, and the pin 53b on the bell crank lever 53 is located on the opening cam surface 74a. Consequently, the pin 53a is located at its right-most position after having rotated counter-clockwise about the pivot 53c of the crank lever 53, bringing the diaphragm blades 50 (see FIG. 7) to their fully open positions. Subsequently when zooming toward the wide-photo end, the diaphragm cam plate 74 moves rearwardly while rotating counter-clockwise against the resilience of the spring 72 since it is constrained by the cam surface 75b of the transmitting member 75. Accordingly, the closing cam surface 74b also shifts counter-clockwise, so that the pin 53b of the crank lever 53 moves from the opening cam surface 74a over the closing cam surface 75b, thereby gradually moving downward. Accordingly, when zooming from the telephoto end to the wide-photo end, the pin 53a of the crank lever 53 moves to the left, controlling the diaphragm blades 50 in the closing direction in a gradual manner to maintain the open F-value of "F4.5".

Figure 10B:
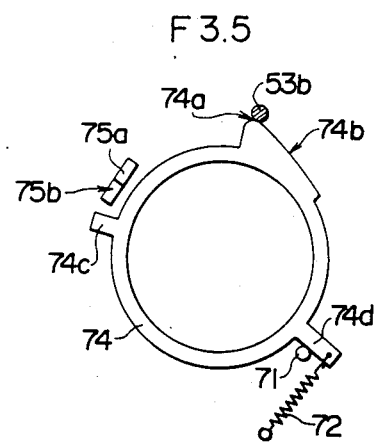

If the diaphragm ring 66 is rotated clockwise from the position for "F4.5" to the position for "F3.5", the diaphragm control transmitting member 75 moves together with the diaphragm ring 66 to be removed from the projection 74c on the diaphragm cam plate 74, as illustrated in FIG. 10(B), and reaches a position where contact between the cam surface 75b and the projection 74c is prevented if the diaphragm cam plate 74 should move rearwardly as a result of zooming toward the wide-photo end. Accordingly, the pin 53b of the crank lever 53 remains on the opening cam surface 74a on the diaphragm cam plate 74, and hence the diaphragm aperture remains at its maximum and unchanged if a zooming operation takes place, and the open F-value changes from "F4.5" under the telescoping condition to "F3.5" under the wide angle condition.

Figure 11:
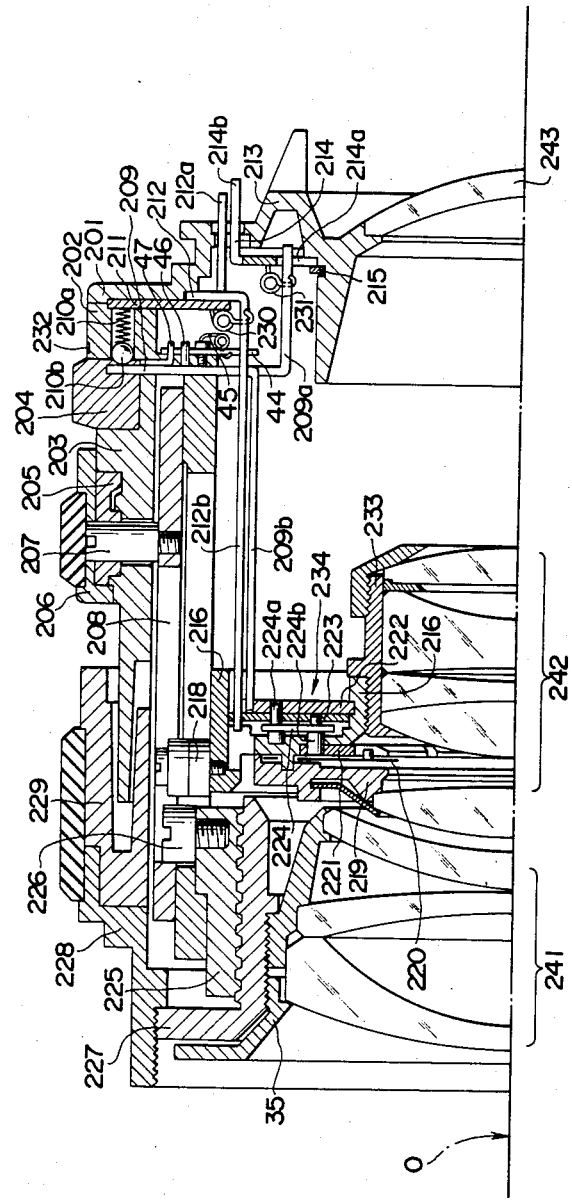
FIG. 11 is an enlarged cross section of an upper one-half of a zoom lens barrel according to a further embodiment of the invention.

FIG. 11 is a cross section of a zoom lens barrel according to a further embodiment of the invention which may be combined with a camera having a programmed control capability to establish a programmed mode. Essential parts of this zoom lens barrel are constructed in a manner illustrated in FIG. 12. As will be noted from FIGS. 11 and 12, the zoom lens barrel of this embodiment comprises the zoom lens barrel shown in FIGS. 1 and 2, to which the function which permits a programmed mode to be established, as will be described later, is added. Accordingly, corresponding parts are designated by like reference numerals as before, to which "200" is added, without repeating their description.

As shown in FIG. 12, a diaphragm ring 204 used in this zoom lens barrel is provided with a mark "P" representing a programmed mode and located adjacent to "F8" mark which represents a minimum diaphragm aperture. Thus, a programmed mode is established when the diaphragm ring 204 is turned to a position where the mark "P" is aligned with an index 232, which position will be hereafter referred to as a program position. A click stop mechanism similar to that mentioned above functions to retain the diaphragm ring 204 at such position.

Referring to FIG. 12, a stop member 44 which comprises a swingable lever is mounted on an external frame 203 in a rockable manner at a point adjacent to the base end of a diaphragm plate actuator 212b of a diaphragm control transmitting member 212. The stop member 44 has an arm 44a which abuts against a lateral edge of the actuator 212b of the transmitting member 212 which assumes a given position. A spring 45, having a resilience greater than the resilience of a spring 230, to be described later, extends between the arm 44a and the external frame 203 and urges the stop member 44 to rotate clockwise. However, the resulting rotation is limited by the abutment of its other arm 44b against a detent pin 46 which is fixedly mounted on the external frame 203. Accordingly, a rotation of the diaphragm control transmitting member 212 in the clockwise direction or in the direction opposite from the diaphragm closing direction is normally limited by the stop member 44, and thus remains stationary at a given position.

A stop changing member 47 which cooperates with the stop member 44 is disposed at a given position on the diaphragm ring 204. Specifically, the stop changing member 47 is secured to the diaphragm ring 204 at a position where it is capable of driving the arm 44b of the stop member 44 to move through a given stroke against the tension of the spring 45 when the ring 204 is turned to bring the program mark "P" into alignment with the index 232.

A diaphragm cam plate 222 is formed with a plurality of cam slots which are used to determine a diaphragm aperture, including an opening cam slot 222a, a closing cam slot 222b and an arcuate minimum aperture cam slot 222d which continues from an end of the cam slot 222b, corresponding to the minimum diaphragm aperture thereof and which is located at an equal distance from the optical axis O.

It is to be understood that this zoom lens barrel can be effectively used with a programmed camera in which a shutter thereof is controlled as a result of the photometry of light passing through a diaphragm which is actually controlled to a given aperture. Accordingly, a camera which is mounted on this zoom lens barrel is provided with a programmed control circuit which performs the described operation.

The operation of the zoom lens barrel constructed in the manner mentioned above will now be described on the assumption that the barrel is one in which the open F-value changes from F4.5 to F3.5, for example, as a result of zooming from the telephoto end toward the wide-photo end when the correction capability which maintains the open F-value constant is ineffective.

Figures 13A, 13B, 13C:
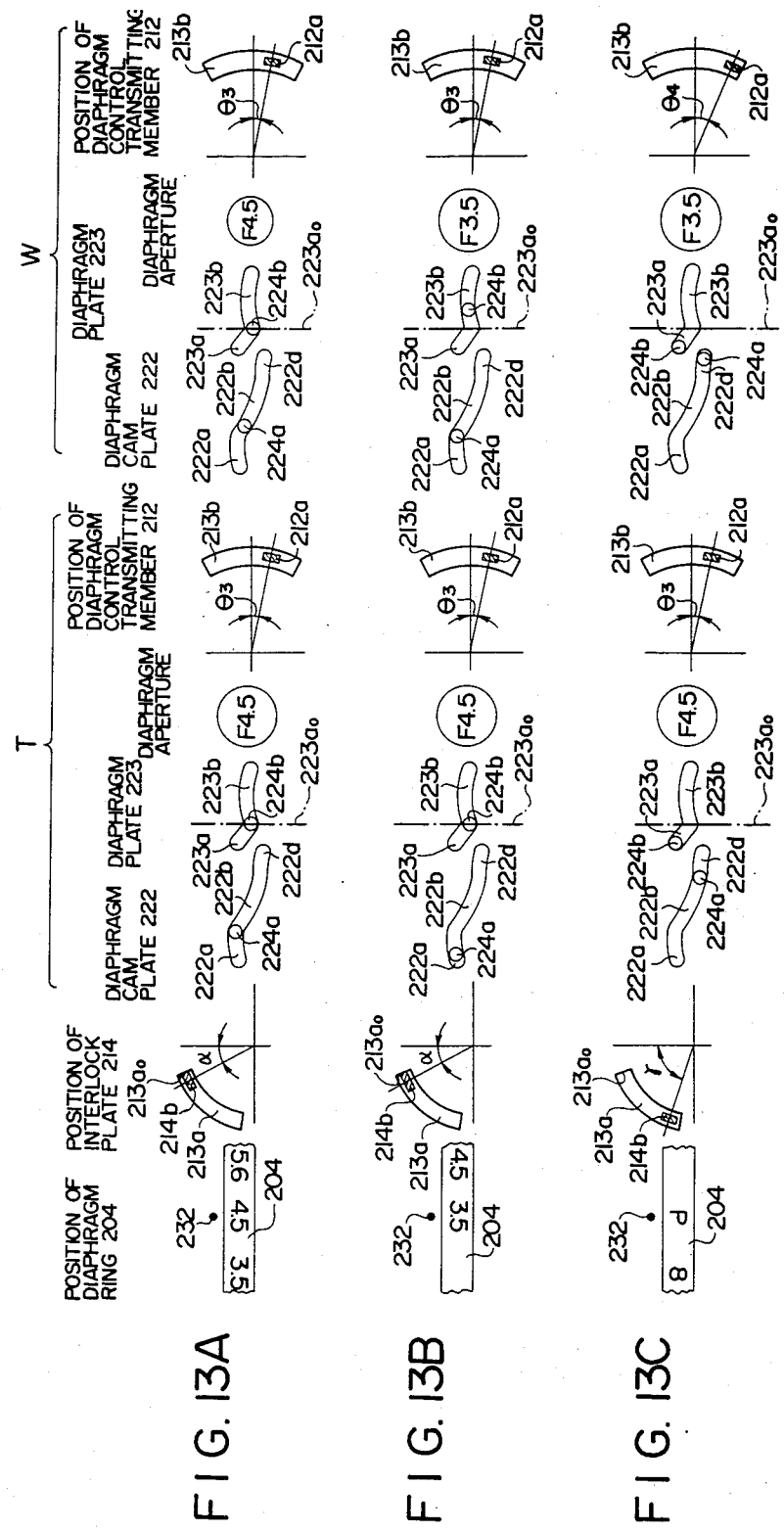
FIGS. 13(A) to 13(C) are a series of diagrams illustrating the positions of an interlock plate and a diaphragm value transmitting member, when a diaphragm ring is turned to different positions in the zoom lens barrel of FIG. 11, and also illustrating the diaphragm controlling operation and diaphragm apertures achieved during a zooming operation.

When the diaphragm ring 204 is turned to bring the "F4.5" mark into alignment with the index 232 (see FIG. 13(A)) or to bring the "F3.5" mark into alignment with the index 232 (see FIG. 13(B)), zooming toward the telephoto end (T) and toward the wide-photo end (W) results in similar operations as mentioned above (refer to FIGS. 6(A) to (C)). A given open F-value is established if a diaphragm value which is of lower light level than "F4.5" is chosen while when a diaphragm value of "F3.5" is chosen, the diaphragm aperture will be established at its maximum and the open F-value changes during the zooming operation.

When the program mark "P" on the diaphragm ring 204 is brought into alignment with the index 232, as illustrated in FIG. 13(C), a diaphragm value presetting member 209 rotates counter-clockwise beyond the position which corresponds to "F8". Hence, an interlock plate 214 is located such that a connecting portion 209a of the diaphragm value presetting member 209 abuts against one end 214$a_0$ of a notched groove 214a formed therein (see FIG. 12), and a body interlock 214b is far removed from a stop 213$a_0$ of an arcuate slot 213a formed in a cover frame 213, as viewed in the counter-clockwise direction. Thus, the body interlock 214b has rotated through an angle $\gamma$ ($>\beta>\alpha$) from the reference position. The interlock plate 214 at this angle position indicates to the camera that a programmed mode is chosen.

At this time, the stop changing member 47 which is secured to the diaphragm ring 204 drives the arm 44b of the stop member 44 through a given stroke, whereby the stop member 44 rotates counter-clockwise against the resilience of the spring 45. The diaphragm control transmitting member 212 which is urged by the spring 230 against the arm 44a of the stop member 44 then follows the rotation of the stop member 44, thus being enabled to rotate clockwise through the same angle as the stop member 44.

When zooming toward the telephoto end (T) at the program position "P", the diaphragm cam plate 222 is located on the free end of a cam actuator 209b of the diaphragm value presetting member 209, and hence rotates counter-clockwise beyond the position which is equivalent to "F8" under the telescoping condition. Accordingly, a pin 224a on an arm 224 is situated at an end of the minimum aperture cam slot 222d formed in the diaphragm cam plate 222 which is located toward the closing cam slot 222b. A diaphragm plate 223 is located on the free end of the diaphragm control transmitting member 212. Accordingly, a pin 224b on the arm 224 is pushed up along the skewed surface of a skewed slot 223a to the upper end thereof. Under this condition, a further clockwise rotation of the diaphragm plate 223 is prevented, and hence the diaphragm control transmitting member 212 does not rotate clockwise, even though the stop member 44 has retracted from its normal position, and remains stationary at its position which it assumed before the stop member 44 has moved angularly. A notched wheel 221 does not rotate under this condition, and hence does not control the diaphragm blades 220 in the closing direction. A diaphragm aperture remains at its maximum and the open F-value is "F4.5". Under the telescoping condition at the program position "P", before the diaphragm controlling operation in the closing direction takes place, an engaging portion 212a of the diaphragm control transmitting member 212 assumes a given angular position which is removed by an angle $\theta_3$ from a reference position, as when a normal diaphragm value other than the programmed mode is chosen. If the diaphragm control transmitting member 212 is operated on the camera to rotate counter-clockwise under this condition, the diaphragm plate 223 also rotates in the same direction, whereby the pin 224b is driven downward toward the optical axis 0 along the skewed surface of the skewed slot 223a. Accordingly, the notched wheel 221 rotates counter-clockwise, controlling the diaphragm blades 220 in the closing direction toward a minimum diaphragm aperture. A particular diaphragm aperture is determined by stopping the diaphragm control transmitting member 212 at a given angular position in response to a command from a programmed control circuit of the camera.

When zooming toward the wide-photo end (W) at the preset position "P", the diaphragm cam plate 222 is located toward the base end of the cam actuator 209b of the diaphragm value presetting member 209, and hence rotates counter-clockwise to a greater degree than under the telescoping condition, whereby the pin 224a on the arm 224 is located in the minimum aperture cam slot 222d. Assuming that the diaphragm control transmitting member 212 does not rotate clockwise, the diaphragm blades 220 would be controlled in the closing direction to a diaphragm aperture which is equivalent to "F4.5" under the side angle condition, just in the same manner as when a diaphragm value of "F4.5" is preset as mentioned previously. In the course of such controlling operation, the pin 224b on the arm 224 would be located within the inclined slot 223a in the diaphragm plate 223 intermediate its length. However, the diaphragm control transmitting member 212 is enabled to rotate clockwise in response to the rotation of the stop member 44 as mentioned previously, so that both the diaphragm control transmitting member 212 and the diaphragm plate 223 rotate clockwise. The clockwise rotation of the diaphragm plate 223 in the clockwise direction causes the notched wheel 221 to rotate in the same direction, namely, in a direction opposite from the direction of rotation during the diaphragm closing operation. Accordingly, the pin 224b is located at the upper end of the skewed slot 223a formed in the diaphragm plate 223, or at its open position, preventing the diaphragm blades 220 from being controlled in the closing direction. Thus the diaphragm aperture remains open, and the open F-value of "F4.5" under the telescoping condition is maintained. In other words, the open F-value of "F3.5" is obtained under such wide angle condition. Under the wide angle condition when the program position "P" is chosen, before the shutter blades are controlled in the closing direction, the engaging portion 212a of the diaphragm control transmitting member 212 is removed by an angle $\theta_4$ ($>\theta_3$) from the selected reference position, and the diaphragm control transmitting member 212 remains stationary at an angular position which is removed from the given position by an angle ($\theta_4 - \theta_3$). When the diaphragm control transmitting member 212 is now operated on the camera to rotate counter-clockwise, the diaphragm plate 223 rotates in the same direction, whereby the diaphragm blades 220 are controlled in the closing direction toward its minimum aperture. A particular aperture is determined by terminating the rotation of the diaphragm control transmitting member 212 at a given position which is based on a command from a program control circuit of the camera.

Figure 14:
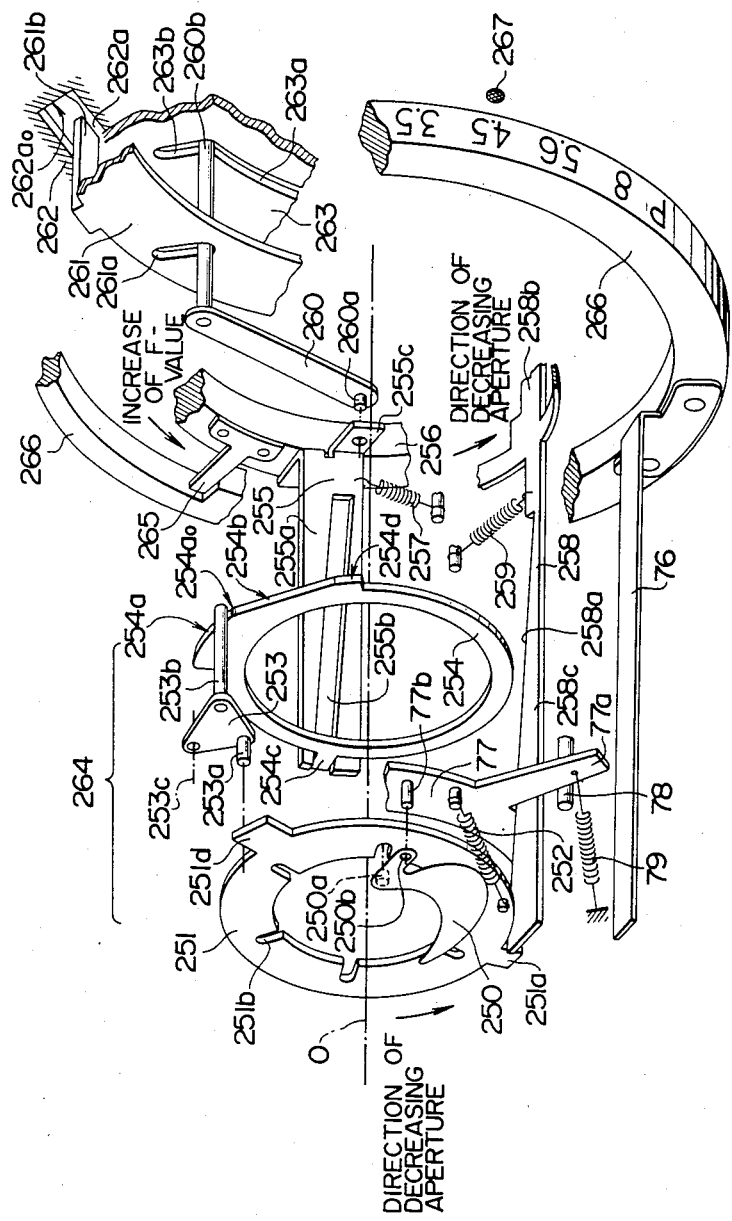
FIG. 14 is an exploded perspective view of an essential part of a zoom lens barrel according to yet another embodiment of the invention.

FIG. 14 is an exploded perspective view of essential parts of a zoom lens barrel according to yet another embodiment of the invention. The zoom lens barrel shown in FIG. 14 essentially comprises the zoom lens barrel shown in FIG. 7, to which the capability of establishing a programmed mode is added. Corresponding parts to those shown in FIG. 7 are designated by like reference numerals, to which "200" is added, without repeating their description. Specifically, an automatic diaphragm mechanism 264 includes a rotary diaphragm frame 77 which is disposed to be rotatable with respect to stationary parts such as the diaphragm frame 216 (see FIG. 12). The frame has a stop 77a on its outer periphery, and a spring 79 extends between the stop 77a and a stationary part to urge the rotary frame 77 to rotate clockwise. However, the resulting rotation of the frame 77 is limited by the abutment of the stop 77a against a stop pin 78. Each diaphragm blade 250 has a support opening 250b which is fitted over a pivot pin 77b on the rotary frame 77. A spring 252 extends between a notched wheel 251 and the rotary frame 77 to enable a relative rotation therebetween, thereby opening or closing the diaphragm blades 250. A diaphragm cam plate 254 includes a closing cam surface 254b, and an arcuate minimum aperture cam surface 254d which continues from an end of the cam surface 254b corresponding to its minimum aperture and disposed at a uniform distance from the optical axis 0. A diaphragm ring 266 carries a mark "P" representing a programmed mode adjacent to the "F8" mark. A stop changing member 76 is secured to the diaphragm ring 266 and extends to the vicinity of the stop 77a on the rotary diaphragm frame 77 so as to be able to drive it.

It will be noted that a link cam 263 is formed with cam slots 263a, 263b which function in quite the same manner as the cam surfaces 63a, 63b formed in the link cam 63 shown in FIG. 7 and described above.

Figure 15A:
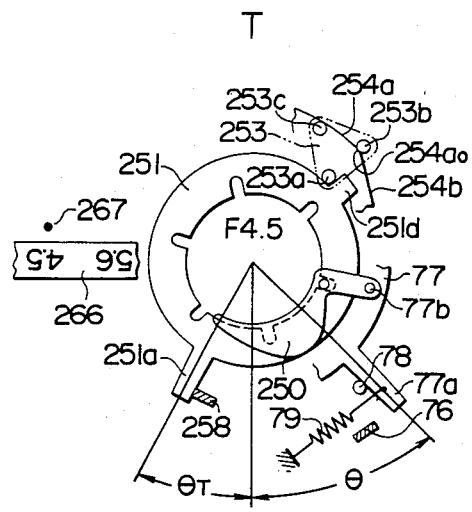
FIGS. 15(A) to 15(D) are fragmentary front views showing changes occurring in the diaphragm aperture during a zooming operation when a diaphragm ring in the zoom lens barrel of FIG. 14 is turned to different positions.
Figure 15B:
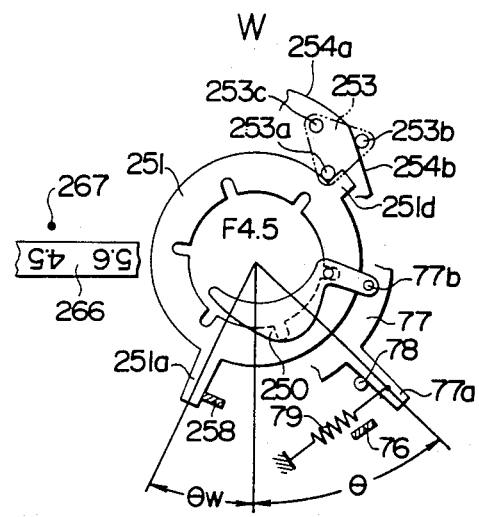
Figure 15C:
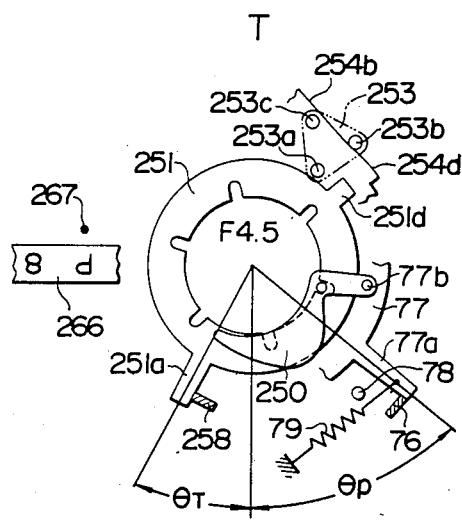
Figure 15D:
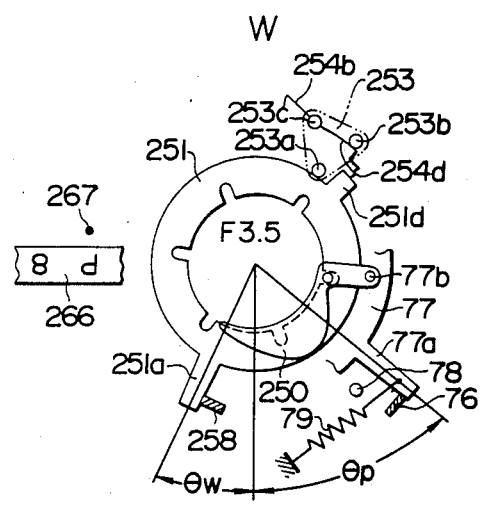

Referring to FIGS. 15(A) to (D), the diaphragm controlling operation in the zoom lens barrel of FIG. 14 will now be described. In this embodiment, when the diaphragm ring 266 is turned to bring any mark between "F3.5" and "F8" into alignment with the index, the stop changing member 76 is prevented from abutting against the stop 77a on the rotary diaphragm frame 77, and hence the frame 77 does not rotate. Accordingly, the operation takes place in the same manner as mentioned in connection with the embodiment shown in FIG. 7. For example, when "F4.5" is chosen on the diaphragm ring 266, zooming toward the telephoto end (T) and the wide-photo end (W) results in the similar operation as before, establishing diaphragm apertures as indicated in FIGS. 15(A) and (B), respectively, providing a constant open F-value of "F4.5". If "F3.5" is chosen on the diaphragm ring 266, the correcting function which maintains the open F-value constant is terminated and the maximum diaphragm aperture is maintained over the entire zooming range, providing open F-values of "F4.5" toward the telephoto end (T) and of "F3.5" toward the wide-photo end (W), as mentioned previously in connection with the embodiment shown in FIG. 7.

When the diaphragm ring 266 is turned to bring the program mark "P" into alignment with the index 267 to establish a programmed mode, a body interlock 261b rotates counter-clockwise in excess of an angular stroke which corresponds to a difference over the light level of "F8". The stop changing member 76 secured to the diaphragm ring 266 rotates in a similar manner, and hence the stop 77a on the rotary frame 77 is driven by the stop changing member 76 to rotate counter-clockwise against the resilience of the spring 79.

When zooming toward the telephoto end at the preset position "P", the notched wheel 251 is disposed for engagement with the front end of a cam surface 258a, in the same manner as mentioned above for "F4.5" under the telescoping condition, thereby bringing the diaphragm blades 250 to their fully open position. However, since the rotary diaphragm frame 77 has rotated counter-clockwise from a position corresponding to an angle $\theta$, as referenced to a given angle position, to a position corresponding to an angle $\theta_P$ ($>\theta$) (see FIG. 15(C)), the pivot pin 77b has rotated counter-clockwise in a corresponding manner. Accordingly, the diaphragm blades 250 have rotated beyond the fully open position thereof in the opening direction. A diaphragm aperture is determined by a lens frame (not shown) whenever the diaphragm blades 250 have been opened beyond their fully open position, and hence "F4.5" under the telescoping condition is established. The diaphragm cam plate 254 has been rotated counter-clockwise to its limit by the action of the diaphragm ring 266. Accordingly, a pin 253b is located at an end of the closing cam surface 254b which is disposed adjacent to the minimum aperture cam surface 254d. Hence, a bell crank lever 253 has fully rotated clockwise, and a pin 253a has travelled to its leftmost position and is removed from a stop pawl 251d, reaching a position which is equivalent to a minimum aperture under the telescoping condition. Accordingly, an open diaphragm of "F4.5" is established before a shutter release takes place (see FIG. 15(C)), but when the diaphragm control transmitting member 258 rotates counter-clockwise in response to a shutter release, the notched wheel 251 is driven to its angular position where the stop pawl 251d is constrained by the pin 253a, and the diaphragm blades 250 are controlled in the closing direction toward the minimum aperture. The control of the diaphragm blades in the closing direction is terminated at a given aperture in response to a command from a programmed control circuit of the camera.

When zooming toward the wide-photo end at the preset position "P", the notched wheel 251 rotates in a similar manner as for "F4.5" under the wide angle condition, reaching an angular position for "F4.5" under the wide angle condition. The diaphragm cam plate 254 rotates further counter-clockwise from the position for the telescoping condition, and the pin 253b is located on the minimum aperture cam surface 254d. Accordingly, as when telescoping, the pin 253a travels to its leftmost position. Assuming that the rotary diaphragm frame 77 has not rotated counter-clockwise under this condition, the diaphragm blades 250 would be controlled in the closing direction to an aperture which is equivalent to "F4.5" under the wide angle condition. However, when the programmed mode "P" is established, the rotary diaphragm frame 77 is caused by the stop changing member 76 to rotate counter-clockwise from a position corresponding to the angle $\theta$ to another position corresponding to the angle $\theta_P$, so that the pivot pin 77b moves in the same direction, causing a counter-clockwise rotation of the diaphragm blades 250 to achieve the fully open diaphragm aperture, thus maintaining "F3.5" on the wide angle side (see FIG. 15(D)). When the diaphragm control transmitting member 258 rotates counter-clockwise in response to a shutter release, the notched wheel 251 rotates in the same direction and controls the diaphragm blades 250 in the closing direction toward the minimum aperture until a given aperture determined by a command from a programmed control circuit of the camera is reached.

In FIGS. 15(A) to (D), angles $\theta_T$ and $\theta_W$ represent angles of rotation measured by the location of the engaging pawl 251a of the notched wheel 251 from a given angular reference position. It will be apparent from the above description that the notched wheel 251 rotates through an angle ($\theta_T - \theta_W$) counter-clockwise during a zooming operation from the telephoto end toward the wide-photo end.

FIG. 16 is a perspective view of essential parts of a zoom lens barrel according to yet a further embodiment of the invention. It is to be understood that in FIG. 16, the left side represents the space in which an object being photographed is located while the right side represents a space in which the camera is located. A diaphragm mechanism 90 is of a known construction in which a diaphragm aperture is varied by relative rotation between a diaphragm casing 91 containing diaphragm blades 94 and a diaphragm operating plate 95. Specifically, when the casing 91 is rotated counter-clockwise, as viewed from the left side of the drawing (the similar direction of rotation being followed in the description to follow) or when the operating plate 95 is rotated clockwise, the diaphragm blades 94, each having a support opening 92 fitted over a support pin 91a on the diaphragm casing 91, will be driven in a direction to close the diaphragm aperture as a result of their drive pins 93 being fitted in cam slots 96 formed in the diaphragm operating plate 95 being driven. An interlock pin 89 is fixedly mounted on the periphery of the casing 91, and is engaged with a slot formed in a correction cam plate 84 which is secured to a rotary ring 81. Specifically, the slot comprises a cam slot 86 which extends in a direction parallel to the optical axis O to maintain an aperture, a skewed correction cam slot 85, and a connecting slot 87 which extends circumferentially to connect the ends of the cam slots 85, 86 located nearer the camera. The casing 91 is urged by a spring 103 to rotate counter-clockwise under the condition that the interlock pin 89 is engaged with and constrained by the correction cam plate 84. When the interlock pin 91b integral with the casing 91 is operated by an interlock member 104, the casing 91 is driven for rotation against the resilience of the spring 103. The correction cam plate 84 is urged by a spring 105 to rotate counter-clockwise. The correction cam plate 84 is adapted to be constrained by a stop 88 when it has fully rotated in the counter-clockwise direction. A connecting rod 83 is fixedly mounted on the rear end of the rotary ring 81, and is adapted to be engaged with a step 82a formed on a diaphragm ring 82 to be driven in the counter-clockwise direction when the diaphragm ring 82 is turned clockwise to bring a mark "P" thereon representing a programmed mode, into alignment with the index. A rotary plate 102 which is engageable with an arm 100a of an interlock ring 100 is secured to the diaphragm ring 82. A linear slot 99 is formed in the arm 100a of the interlock ring 103 and extends in a direction parallel to the optical axis 0. An interlock pin 98 on a diaphragm interlock member 97 which is integral with the diaphragm operating plate 95 is engaged with the linear slot 99. The interlock ring 100 is urged by a spring 101 to rotate clockwise so that a motion to control the diaphragm blades in the closing direction is transmitted to the operating plate 95 through the interlock pin 98 and the interlock lever 97. However, the interlock ring 100 is constrained by the rotary plate 102 to an angular position which depends on the angular position of the diaphragm ring 82. A body interlock 100b is formed on and extends rearwardly from the interlock ring 100.

The operation of the zoom lens barrel will now be described. When the diaphragm ring 82 is rotated to establish a particular diaphragm value, such rotation is transmitted to the rotary plate 102. Before a shutter release takes place, the interlock ring 100 is locked to the camera by means of the body interlock 100b, and is restricted from rotating under the resilience of the spring 101. The diaphragm mechanism 90 is integral with a rear lens group (not shown) and is adapted to move along the optical axis O during a zooming operation. The linear slot 99 runs parallel to the optical axis O, so that the diaphragm operating plate 95 does not rotate during a zooming operation. Under the condition shown in FIG. 16, the interlock pin 89 on the casing 91 is engaged with the correction cam slot 85, so that when the casing 91 travels along the optical axis O during a zooming operation, the casing 91 moves angularly in accordance with the inclination of the correction cam slot 85, thus changing the diaphragm aperture in accordance with the focal length. In this manner, the diaphragm aperture is corrected so as to maintain the open F-value constant over the entire zooming range. In response to a shutter release, the interlock ring 100 is rotated under the resilience of the spring 101 in a direction to control the diaphragm blades in the closing direction, and comes to a stop at a position where the arm 100a thereof is constrained by the rotary plate 102 (as illustrated in FIG. 16), thus achieving a diaphragm aperture which corresponds to the diaphragm value chosen.

For the programmed mode, an initial zooming operation is made to move the interlock pin 89 toward the wide-photo end from its position adjacent to the wide-photo end of the correction cam slot 85, as shown in FIG. 16, so as to be engaged with the connecting slot 87. The diaphragm ring 82 is rotated clockwise under this condition to bring the mark "P" thereon into alignment with an index, not shown. The step 82a of the diaphragm ring 82 then engages the connecting rod 83, whereby the correction cam plate 84 is rotated clockwise against the resilience of the spring 105, allowing the interlock pin 89 to move through the connecting slot 87 into the cam slot 86 which is used for maintaining the aperture. Accordingly, when a zooming operation takes place under this condition, the diaphragm casing 91 does not rotate, and hence there is no change in the diaphragm aperture. In other words, when the programmed mode is established, the open F-value changes in the course of the zooming operation, in a similar manner to the embodiments described above. When a shutter release takes place under this condition, the interlock ring 100 can be rotated to the minimum aperture position where the arm 100a is constrained by the rotary plate 102, but its rotation is interrupted at a given aperture which is determined by a command from a programmed control circuit of the camera.

What is claimed is:

1. A zoom lens barrel of the type in which an open F-value varies during a zooming operating when a diaphragm aperture defined by a diaphragm mechanism does not vary with the zooming operating; comprising
    aperture correcting means for varying a diaphragm aperture defined by the diaphragm mechanism for the purpose of correction so that an open F-value is maintained constant over an entire zooming range;
    a diaphragm ring for determining a diaphragm value to be used during a photographing operating; and
    means operative when the diaphragm ring is brought to a given position to terminate the correcting operation by the correcting means to allow the diaphragm aperture to be open during operation of the zoom lens barrel, thereby maintaining a maximum aperture.

2. A zoom lens barrel of the type in which an open F-value varies with a zooming operation when a diaphragm aperture defined by a diaphragm mechanism does not vary with a zooming operation, comprising:
    a diaphragm ring for determining a diaphragm value to be used during a photgraphing operation;
    diaphragm value transmitting member coupled with the diaphragm ring for movement therewith through a diaphragm value presetting member which is integral with the diaphragm ring in order to transmit a diaphragm value determined by the diaphragm ring to a photometric circuit of a camera;
    a diaphragm aperture determining member including a controlling cam disposed for movement with the diaphragm ring to control the diaphragm aperture defined by the diaphragm mechanism to a diaphragm value determined the diaphragm ring;
    a diaphragm blade operating member disposed for movement with an automatic diaphragm control member which is driven from the camera side during an initial phase of a series of photographing operations which occur in response to the depression of a release button for controlling diaphragm blades in the closing direction to an aperture determined by the aperture determining member;
    diaphragm aperture correcting means for varying a diaphragm aperture defined by the diaphragm mechanism for providing a correction to maintain an open F-value constant over an entire zooming range, by changing a relative position between the diaphragm ring and the aperture determining member and between the automatic diaphragm control member and diaphragm blade operating member during a zooming operation;

means for terminating a correcting operation by the diaphragm aperture correcting means to allow the diaphragm aperture to be open and to maintain a maximum aperture, the terminating means being operative whenever the diaphragm ring is turned to a given position beyond a position of the diaphragm ring which represents one, corresponding to the maximum aperture, of the diaphragm values over which the open F-value can be maintained constant by the action of the diaphragm aperture correcting means; and means for interrupting the operational connection between the diaphragm ring and the diaphragm value transmitting member when the diaphragm ring is set to the given position.

3. A zoom lens barrel according to claim 2 which the diaphragm aperture correcting means comprises detents formed on the diaphragm aperture determining member and the diaphragm blade operating member, respectively, which move in the direction of the optical axis during a zooming operation, and a pair of actuators disposed for engagement with the detents, respectively, and forming an integral part of the diaphragm value presetting member and the automatic diaphragm control member, respectively, and arranged at angles with respect to the optical axis, the actuators each being disposed in sliding contact with one of the respective detents to impart a rotational component of motion to the aperture determining member and the diaphragm blade operating member, respectively, as the latter two members move in the direction of the optical axis.

4. A zoom lens barrel according to claim 2 in which said means for maintaining the maximum aperture comprises an arcuate opening cam formed in the aperture determining member which communicates with an end of a closing cam, also formed therein, which is located toward the open value, the arcuate opening cam being effective to allow an idle operation of the aperture determining member while maintaining the maximum aperture defined by the diaphragm mechanism when the diaphragm aperture correcting means causes the aperture determining means to rotate in a direction to control the diaphragm blades in a closing direction.

5. A zoom lens barrel according to claim 2 in which said interrupting means comprises an arcuate notched elongate slot formed in the diaphragm value transmitting member, a connecting portion of the diaphragm value presetting member which is engaged with the notched slot, and a spring extending between the diaphragm value transmitting member and the diaphragm value presetting member for normally maintaining the connecting portion in abutment against one end of the notched slot to provide an integral connection therebetween, the arrangement being such that when the diaphragm value presetting member is set to a diaphragm value corresponding to the maximum aperture, the diaphragm value transmitting member ceases to rotate by abutment against a positioning stop which establishes an open condition in the camera while only the diaphragm value presetting member is allowed to continue to rotate against the resilience of the spring.

6. A zoom lens barrel according to claim 2 in which the interrupting means comprises a skewed slot formed in the diaphragm value transmitting member in the form of an annular interlock plate, a link having its one end rockably connected to the diaphragm value presetting member and having a pin located on the other end thereof and engaged with the skewed slot, and a link cam on a stationary member including an arcuate cam which is engaged by the pin to guide it and another cam which continues from the arcuate cam and is formed at an angle of inclination which coincides with the angle of the skewed slot, the arrangement being such that when the diaphragm value presetting member is set to a diaphragm value which corresponds to the maximum aperture, the interlock plate ceases to rotate by abutment against a positioning stop which establishes an open condition in the camera while the diaphragm value presetting member continues to rotate by having the pin on the link engaged with the inclined cam.

7. A zoom lens barrel of the type in which an open F-value varies with a zooming operation when a diaphragm aperture defined by a diaphragm mechanism does not vary with a zooming operation; comprising diaphragm aperture correcting means for varying a diaphragm aperture defined by the diaphragm mechanism for the purpose of correction so as to maintain an open F-value constant over an entire zooming range;

a diaphragm ring for determining a diaphragm value to be used during a photographing operation; and means for terminating the correcting operation by the diaphragm aperture correcting means to allow the diaphragm aperture to be open and to maintain the maximum aperture whenever the diaphragm ring is set to a given position beyond a position of the diaphragm ring which represents one, corresponding to the minimum aperture, of the diaphragm values over which the open F-value can be maintained constant by the action of the diaphragm aperture correcting means.

8. A zoom lens barrel according to claim 7 in which the diaphragm aperture correcting means comprises an interlock pin integrally formed on a diaphragm casing which is adapted to move in the direction of the optical axis in connection with the zooming operation, and a correction cam formed on a correction cam plate at an angle with respect to the direction of the optical axis and slidably receiving said interlocking pin to impart a rotational component of motion to the diaphragm casing as it moves in the direction of the optical axis.

9. A zoom lens barrel according to claim 7 in which the terminating means comprises an interlock pin integral with a diaphragm casing which is adapted to move in the direction of the optical axis in connection with the zooming operation, a correction cam plate having a correction cam which is engaged by the interlock pin, an aperture maintaining cam formed on the correction cam plate to extend in parallel relationship with the optical axis and having a portion which continues to the correction cam, an open condition switching member integrally formed with the diaphragm ring, and an interlock member formed integrally with the correction cam plate and adapted to be driven through a given stroke by the switching member when the diaphragm ring is set to the given position, thereby causing the correction cam plate to rotate through a given angle to shift the interlock pin from the correction cam to the aperture maintaining cam.

10. A zoom lens barrel of the type in which an open F-value varies in connection with a zooming operation when a diaphragm aperture defined by a diaphragm mechanism does not vary with a zooming operation; comprising a diaphragm ring for determining a diaphragm value to be used during a photographing operation;

a diaphragm aperture determining member disposed for movement with the diaphragm ring and having a diaphragm controlling cam for controlling a diaphragm aperture defined by the diaphragm mechanism to a diaphragm value determined by the diaphragm ring;

a diaphragm blade operating member operatively coupled with an automatic diaphragm control member which is driven by a camera during an initial phase of a series of photographing operations which occur in response to the depression of a release button for controlling diaphragm blades in the closing direction to a diaphragm aperture determined by the aperture determining member;

diaphragm aperture correcting means for varying a diaperture defined by the diaphragm mechanism for the purpose of correction so as to maintain an open F-value constant over an entire zooming range, by changing a relative rotational position of the aperture determining member with respect to the diaphragm ring and a relative rotational position of the diaphragm blade operating member with respect to the automatic diaphragm control member in connection with the zooming operation; and means for terminating the correcting operation by the diaphragm aperture correcting means to allow the diaphragm aperture to be open and to maintain the maximum aperture, the terminating means being operative when the diaphragm ring is turned to a given position beyond a position which represents one, corresponding to the minimum aperture, of the diaphragm values over which the open F-value can be maintained constant by the action of the diaphragm aperture correcting means.

11. A zoom lens barrel according to claim 10 in which the diaphragm aperture correcting means comprises a pair of detents formed on the aperture determining member and the diaphragm blade operating member, respectively, which move in the direction of the optical axis in connection with the zooming operation, and a pair of actuators each formed at an angle with respect to the direction of the optical axis on a diaphragm value presetting member connected to the diaphragm ring and on the automatic diaphragm control member, respectively, and disposed in sliding contact with the respective detents to impart a rotational component of motion to the diaphragm aperture determining member and the diaphragm blade operating member, respectively, as the aperture determining member and the diaphragm blade operating member move in the direction of the optical axis.

12. A zoom lens barrel according to claim 10 in which the terminating means comprises an open condition switching member integrally formed with the diaphragm ring, and an interlock member adapted to be driven by the open condition switching member when the diaphragm ring is set to the given position to permit the automatic diaphragm control member to be rotated in the opposite direction from the direction in which it is rotated when controlling diaphragm blades in the closing direction, by an amount corresponding to an amount of rotation of the diaphragm blade operating member relative to the automatic diaphragm control member which is caused by the diaphragm aperture correcting means during a zooming operation.

13. A zoom lens barrel according to claim 10 in which the terminating means comprises an open condition switching member integrally formed with the diaphragm ring, a rotary diaphragm frame having pivot pins which carry diaphragm blades, the rotary diaphragm frame being normally prevented from angular movement by a stop while urging the diaphragm blade operating member in a direction to control the diaphragm blades in the closing direction, and an interlock mounted on the rotary diaphragm frame and driven by the open condition switching member when the diaphragm ring is set to the given position to permit the rotary diaphragm frame to rotate in a direction to open the diaphragm blades, by an amount corresponding to the closing movement by the diagpragm aperture correcting means which occurs due to rotation of the diaphragm blade operating member relative to the automatic diaphragm control member during a zooming operation.

* * * * *

UNITED STATES PATENT AND TRADEMARK OFFICE
CERTIFICATE OF CORRECTION

PATENT NO. : 4,634,250

DATED : January 6, 1987

INVENTOR(S) : Tamotsu Koiwai

It is certified that error appears in the above-identified patent and that said Letters Patent is hereby corrected as shown below:

IN THE SPECIFICATION

Column 3, line 4, after "with" insert --either--.

Column 6, line 16, change "31" to --21--.

Column 9, line 60, delete "the similar".

Column 16, line 66, change "75b" to --74b--.

Column 19, line 55, change "side" to --wide--.

IN THE CLAIMS

Claim 10, Column 27, line 21, change "diaperture" to --diaphragm aperture--.

Signed and Sealed this

Fifteenth Day of December, 1987

*Attest:*

DONALD J. QUIGG

*Attesting Officer*  *Commissioner of Patents and Trademarks*